(12) United States Patent
Fowler

(10) Patent No.: US 7,945,093 B2
(45) Date of Patent: May 17, 2011

(54) SIMPLIFIED COLOR WORKFLOW

(75) Inventor: John H. Fowler, North Vancouver (CA)

(73) Assignee: Eastman Kodak Company, Rochester, NY (US)

( * ) Notice: Subject to any disclaimer, the term of this patent is extended or adjusted under 35 U.S.C. 154(b) by 708 days.

(21) Appl. No.: 12/014,817

(22) Filed: Jan. 16, 2008

(65) Prior Publication Data

US 2009/0180685 A1    Jul. 16, 2009

(51) Int. Cl.
*G06K 9/00* (2006.01)
(52) U.S. Cl. .................................. 382/167; 382/162
(58) Field of Classification Search .................. 382/167, 382/162, 110; 348/207, 204; 358/1.9, 3, 358/23; 356/406; 430/503, 467; 702/19
See application file for complete search history.

(56) References Cited

U.S. PATENT DOCUMENTS

| | | |
|---|---|---|
| 4,970,584 A | 11/1990 | Sato et al. |
| 5,170,257 A | 12/1992 | Burns |
| 5,781,206 A | 7/1998 | Edge |
| 6,100,999 A | 8/2000 | Ikegami |
| 6,643,029 B2 | 11/2003 | Kumada et al. |
| 2005/0111018 A1 | 5/2005 | Ueda et al. |
| 2006/0243415 A1 | 11/2006 | Holub |
| 2007/0080974 A1 | 4/2007 | Edge et al. |

FOREIGN PATENT DOCUMENTS

| | | |
|---|---|---|
| EP | 0590921 | 4/1994 |
| EP | 0750419 | 12/1996 |
| EP | 1343309 | 9/2003 |

OTHER PUBLICATIONS

"Optimal Sequential Linear Interpolation Applied to Nonlinear Color Transformations", by James Z. Chang, et al., Proceedings of the International Conference on Image Processing, vol. 3, Nov. 13, 1994, pp. 987-991, XP010146485.

"Printing CIELAB Images on a CMYK Printer Using Tri-linear Interpolation" by Sigfredo I. Nin, et al., Proceedings of the SPIE, vol. 1670, Feb. 11, 1992, pp. 316-324, XP000953839.

*Primary Examiner* — Anh Hong Do
(74) *Attorney, Agent, or Firm* — Nelson Adrian Blish

(57) ABSTRACT

A method for predicting a color response of a device comprises: operating the device with image information wherein operating includes utilizing a first correction transform for modifying device color values; determining a first device response based on a device output associated with a device input wherein the device response includes a color response; obtaining a second correction transform; and predicting a modified color response of the device, applicable to operating the device while utilizing the second correction transform instead of the first correction transform, wherein predicting is based on the first color response and the first and second correction transforms.

20 Claims, 13 Drawing Sheets

SIMPLIFIED COLOR WORKFLOW

CROSS REFERENCE TO RELATED APPLICATIONS

Reference is made to commonly-assigned copending U.S. patent application Ser. No. 12/014,821, filed herewith, entitled SIMPLIFIED COLOR WORKFLOW, by Fowler et al., the disclosure of which is incorporated herein.

FIELD OF THE INVENTION

The present invention pertains to color management and in particular to workflow for simplifying color management.

BACKGROUND OF THE INVENTION

Graphic art devices typically have a basic response that is not well suited for predictable, high quality capture or reproduction of images. In practice this can mean that a set of outputs produced by the device for a given set of inputs is not as desired. For a capture device, such as a scanner, known color inputs (e.g. a scanned reference sample) may produce device color coordinate outputs (e.g. RGB color coordinates) that are not desirable in some way. For a reproduction device, such as a printer, input color coordinates (e.g. inking vectors) may produce an output image with undesirable color.

The relationship between a device's inputs and outputs is known as a device response and can include a tonal response and a color response, as examples. For example, tonal response identifies the range of actual tones (e.g. lightness or darkness) output by a printer as a device color coordinate input varies. As another example, color response identifies the range of colors output by a printer as device color coordinate inputs vary. A device response may correspond to, for example, an instance of a physical device, a type of device (e.g. a specific model of printer), a population of similar devices (e.g. different printers that produce color similarly) or on an abstract device (e.g. a standard color space).

A device response may depend upon the device's operating conditions. Operating conditions may include environmental conditions, physical device conditions (e.g. functional state of components), and operational device settings as examples. A collection of device operating condition values can be used to identify a device condition. In other words, a device condition implies a specific device response for a device, including, for example a specific tonal response and a specific color response.

Changes to some device settings, such as exposure settings, can provide coarse corrections to a device response. Finer corrections may need to be made by transforming device color coordinate values. Different types of color transformations are known in the art, including those that seek to correct on the basis of a single color channel or multiple channels simultaneously.

An example of a single channel correction is tone value correction wherein inputs to (or outputs from) a single color channel of a device are modified to produce an intended tonal response. For a printing device, for example, an intended tonal response may be one that is established as a standard (e.g. to facilitate predictable printing by different printing devices or firms). As another example, an intended tonal response may be that of a physical reference (e.g. a reference printer of similar type or one that has desirable characteristics). In these cases, each channel of device color coordinates received as inputs is modified independently to enable reproduction of the tonal intent for each channel. For capture devices, color coordinate outputs produced from capturing a reference tone step image, as an example, are typically modified to meet a tonal intent. Lookup tables or algorithmic functions corresponding to a graphic curve are common embodiments of tone correction transforms used to transform a device's basic tonal response into an intended tonal response.

Correcting tonal response is usually an iterative process which consumes time and physical resources. For example, it is common to perform a first printing run to characterize a printing device's tonal response using a nominal correction transform. An exemplary nominal transform may be an identity transform that performs no tone value correction. As another example, a nominal transform may be one that is anticipated for the type of device. Characterizing tonal response can involve printing images with a variety of known tone input values and using devices to objectively measure the device response. For example, a densitometer can be used to measure ink density for a halftone print area relative to un-inked and fully inked paper. A first iteration may produce characterization data indicating that the device response matches the tonal intent. It is more likely, however, that two or more print iterations with corresponding adjustments to the tone correction transform are required before the tonal response matches the tonal intent.

Sometimes performing a single channel correction is inadequate because a tonal intent sacrifices gray balance. For example, a neutral color vector (e.g. cyan=10%, magenta=10%, and yellow=10%) input to a tonally corrected printing device produces a color with a noticeable chromatic hue. Assuming gray balance is important to the printing firm, further print iterations with adjustments to the existing tone correction transforms may be required to achieve a tradeoff between gray balance and tonal intent goals.

An example of multi-channel correction is calorimetric correction wherein inputs to (or outputs from) multiple color channels of a device are modified, as a set, to achieve an intended color response. Multi-channel corrections can be performed using multi-dimensional transforms. A multi-dimensional transform can be embodied as lookup tables, algorithms or other means. An intended color response, for example, may be motivated by normalizing a particular device's color response (e.g. to an idealized response for a population of similar devices). As another example, a normalized color response may be an abstract device defined by a standard or a physical reference. It is common in the art to use device-independent color specifications (e.g. CIELAB or CIEXYZ color coordinates) to characterize the color response of a device. For example, for a printing device, a printing run using reference image data including a variety of elements having known inking vectors is used to characterize the color response of the printer following tone correction print runs.

Characterizing color response can involve, for example, measuring the printed image with a spectrophotometer to identify the device-independent color coordinates associated with input inking vectors. With suitably chosen inking vectors (e.g. permutations of 10% tone increments of each ink), device-independent color coordinates for the unmeasured inkings can be estimated using well known interpolation methods. A forward model of the reproduction device's color response can thus be derived from the measurements to estimate a device-independent color reproduced for a device color vector. A forward model can be used with well known methods to create a reverse model of the device (i.e. device color vectors required to achieve a particular device-independent color). These models are commonly embodied in a color profile for the device. The International Color Consortium (ICC) provides recommendations for exemplary color profiles. An ICC profile captures samples from the models in lookup tables and provides additional information regarding color reproduction. For the purposes of this application, a forward model means a model for converting device color coordinates into device-independent color coordinates and a reverse model means a model for converting device-independent color coordinates into device color coordinates.

Color management is another motivation for performing multi-channel color correction. As an example, it may be desirable for an inkjet printer to approximate the color produced by a different type of device such as an offset printing press by performing a multi-channel correction of data submitted to the inkjet printer based on the response of the printing press. In other words, an inkjet print can provide a low cost approximation of the final printed product. For the purposes of this application, color correction is understood to include all multi-channel modification of color values associated with a device.

Correction for a printing device can involve a number of steps. As an example, a first step can involve obtaining a forward model of the source color response and pairing that with the reverse model for the characterized printing device. A color element produced by the printing device approximates the source color by first determining, for example, CIELAB coordinates based on the source forward model. Then the printing device's inking vectors can be determined using the reverse model of the printing device. When an inking vector, calculated by the pair of models, is printed, the inking vector may be corrected to correspond with an idealized device using a multi-channel correction transform. Finally the constituent colorant values can be tonally corrected using single-channel tone correction transforms before printing.

An exact calorimetric match is not always possible since a device may not be able to produce all of the colors specified by the source gamut. In some cases the transformation between device-independent color and device color can involve a gamut mapping function to compensate. In addition, errors (e.g. precision and interpolation errors) can be introduced in the characterizing and correcting processes. In some cases, a new lookup table (e.g. a device link in ICC terminology) can be generated that maps directly between source color coordinates and device color coordinates.

Performing tone and color corrections as described above may therefore involve several iterations of device characterization for a particular device condition. Further, each device may be operated in a variety of conditions (e.g. different device-related settings or consumables), each of which may need to be similarly characterized and corrected. Even worse, characterization must be repeated periodically since device conditions can change over time.

In a typical printing firm, hundreds of device conditions can exist for a range of capture and reproduction devices. For a given job, corrections for each device involved in the job needs to be coordinated so that predictable results are achieved. Prior art systems have placed the burden on users to manually establish the appropriate corrections for each device condition in the job workflow. Because the number of correction permutations is large and the dependencies between the corrections are relatively complex the opportunity for user error is high when establishing a job workflow.

Complexity is further increased when additional color settings, such as user preferences and spot color mappings are introduced into a workflow. User preferences can, for example, define how to map dissimilar gamuts. As another example, different device responses may be desired for the same device condition in different jobs. For a job defining colors that are not used by a reproduction device (e.g. spot colors), users must maintain a color library (e.g. named color and device-independent color coordinate pairs) along with a color recipe library (e.g. mixture of specific device colors for a device response that produce the desired color).

As complex as it may be to establish the appropriate workflow color settings 2, maintaining them can be even more of a challenge since some settings are inter-dependent. For example, a change in a tone correction transform for a printer may mean that color correction transforms and color recipes need to be changed. As another example, modifying a reproduction consumable (e.g. changing production lot) may affect each of the workflow color settings 2.

A need exists, therefore, to reduce the time and resources required for characterizing and correcting graphic art device responses so that predictable results can be achieved. Further, a need exists to simply and reliably manage the relationship between various color workflow settings in a system where multiple devices and/or device conditions exist.

SUMMARY OF THE INVENTION

Briefly, according to one aspect of the present invention a method for predicting a color response of a device comprises: operating the device with image information wherein operating includes utilizing a first correction transform for modifying device color values; determining a first device response based on a device output associated with a device input wherein the device response includes a color response; obtaining a second correction transform; and predicting a modified color response of the device, applicable to operating the device while utilizing the second correction transform instead of the first correction transform, wherein predicting is based on the first color response and the first and second correction transforms.

The present invention provides a system and method for managing a graphic arts color workflow. According to one aspect of the invention, the system can predict a device color response based on previously determined color response and new correction information. The predicted color response can then be used in conjunction with other information for color correction. Since re-characterization of a corrected color response is omitted, the method and system saves time and increases device utilization.

According to one aspect of the invention, a first print run can be used to characterize a first device response, including tonal and color responses, for a device condition. A first color profile can be generated based on the first color response of the device. A set of correction transforms can then be generated based on the first device response and an intended device response. Subsequent print runs may be performed to verify and/or modify the set of correction transforms. One or more prediction transforms can be created, based in part on the final iteration of the correction transforms. A prediction transform can be used to adapt the first color profile in order to predict the color response when the correction transforms are used. A modified color profile can then be determined based on the predicted color response.

According to one embodiment of the invention, prediction transforms are incorporated in the first color profile. In one preferred embodiment, wherein the color profile is an ICC profile, prediction transforms are incorporated as "A curves" in the ICC profile.

According to another aspect of the invention, a color workflow includes an automated means for modifying image data to achieve consistent and predictable color reproduction of image data supplied from a variety of source devices and reproduced on a variety of destination devices with a variety of user preferences. The color workflow includes a color setup module that encapsulates color settings for the variety of associated device conditions. The color setup module simplifies identification and maintenance of the color settings. In one embodiment a color setup map provides a visual representation of associated device conditions available to a workflow and automatically creates image data transforms based on the device responses associated with those device conditions. Those transforms can be used to exchange image data between devices associated with those device conditions.

In one preferred embodiment, a user can identify an emulation condition for a device condition in a color setup map. The emulation condition allows a user to customize the associated device response without affecting the default or standard device response, which may be referenced by a number of other maps or other color settings.

According to another aspect of the invention, a color setting dependent upon a device response is automatically updated when a change affecting the device response is recorded. According to another aspect of the invention, a history of color settings is retained so that historical configurations, including dependent color settings, can be easily restored.

These and other aspects of the present invention are illustrated in the detailed description of the invention.

DETAILED DESCRIPTION OF THE INVENTION

Figure 1:
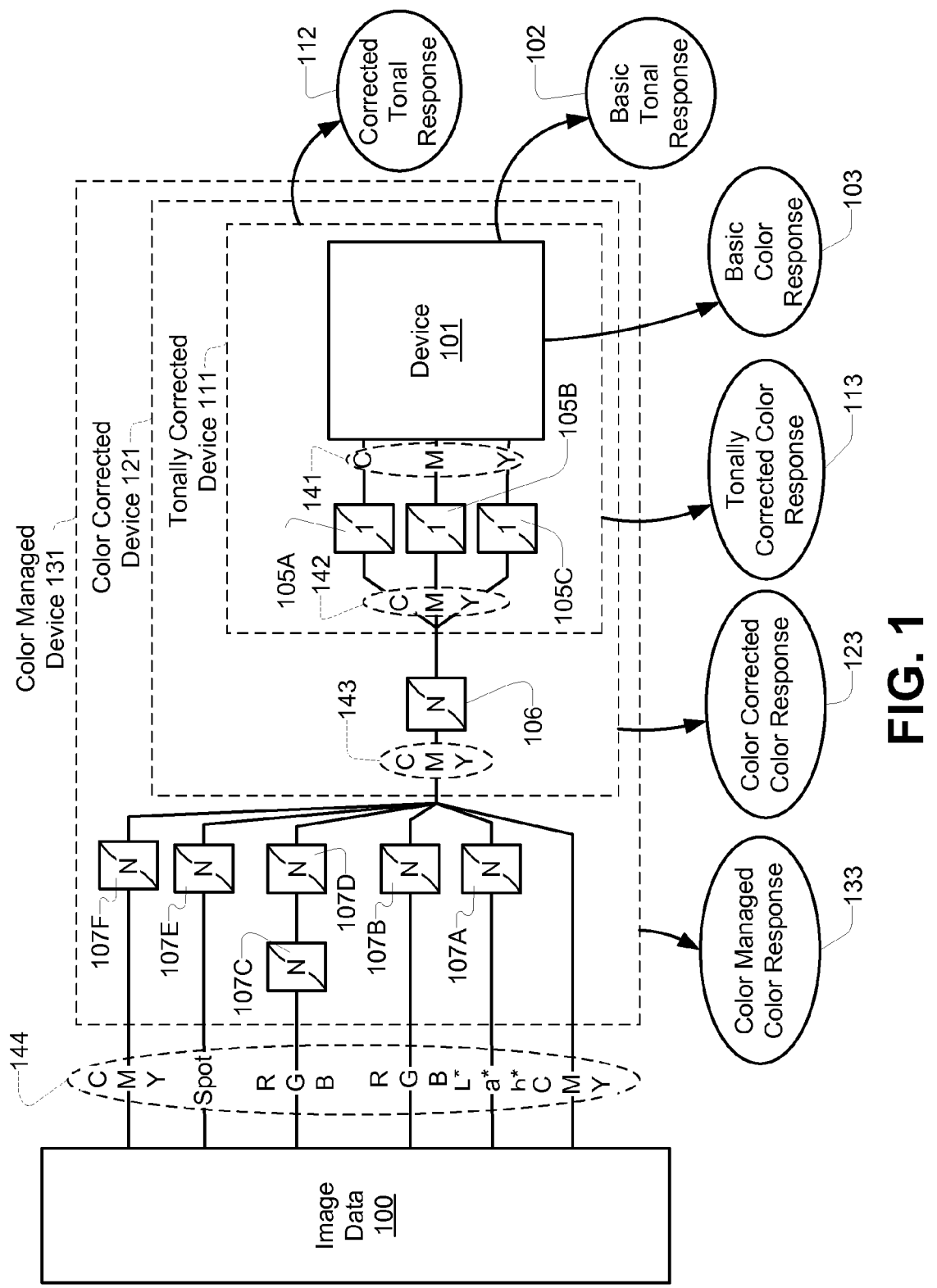
FIG. 1 is a diagram illustrating exemplary device responses and corrections for an exemplary device according to the present invention.

FIG. 1 is a diagram illustrating exemplary device responses and corrections for an exemplary device according to the present invention. Image data 100 is to be printed on reproduction device 101, which deposits cyan, magenta and yellow colorants. Printing devices typically utilize more than three colorants, but the smaller example set is chosen for illustrative clarity. Image data 100 can include elements defined to paint colors defined in one or more color spaces which may or may not correspond to the color space of device 101. Corrections can be performed on image data 100 based, in part, on responses identified for device 101. As described below, a device response can include information for a variety of types of responses including tonal responses and color responses.

Basic tonal response 102 can be determined for device 101 by reproducing and characterizing a range of tone steps for each device colorant, provided as device input 141, as an example. Basic tonal response 102 is valid for the device condition corresponding to the specific device-related settings, environment and consumables associated with the characterization process. In the prior art, this characterization normally occurs as part of a first reproduction run.

According to the present invention, basic color response 103 can also be determined for device 101 during the first run. Basic color response 103 is valid for the same device condition as above and can be determined by reproducing a range of multi-color vectors, provided as device input 141. In prior art systems, this characterization might not normally be performed at this stage since tone corrections may still need to be performed.

Based on basic tonal response 102, and consistent with prior art systems, a set of tone correction transforms 105A-105C can be produced. Device 101, operated with transforms 105A-105C, corresponds to tonally corrected device 111 and exhibits corrected tonal response 112. Tonal response 112 can be verified, for example, by submitting the same range of tone steps provided in the first reproduction run to tonally corrected device 111, as tonally corrected device input 142, and characterizing the resulting reproduction. One or more reproduction runs and adjustments to transforms tone correction 105A-105C may be required to achieve the desired tonal response and/or gray balance. The latter requires also printing various neutral combinations of device colorant values, instead of single colorant values.

According to the present invention, tonally corrected color response 113 need not be characterized if basic color response 103 was previously determined. Rather, tonally corrected color response 113 can be predicted, as described below, from basic color response 103 and tone correction transforms 105A-105C. In some situations, such as when nominal tone correction transforms 105A-105C are used in the first characterizing reproduction, tonally corrected color response 113 may be identified in the first run instead of basic color response 103. Then, after tone correction transforms 105A-105C have been finalized, a modified tonally corrected color response 113 can be predicted from original tonally corrected color response 113 and the original and new tone correction transforms 105A-105C. Note that corrected tonal response 112 and tonally corrected color response 113 relate to device color vectors supplied as tonally corrected device input 142.

Based on tonally corrected color response 113, color correction transform 106 can be produced to obtain color corrected color response 123 for color corrected device 121. Color correction transform 106 can be embodied as a multi-dimensional lookup table for example. This type of correction may be performed by some systems, for example, to ensure a population of similar devices has a consistent color corrected color response 123. According to the present invention and in contrast with prior art systems, color corrected color response 123 can be predicted based on one or more of color responses 113 and 103 and correction transforms 106 and 105A-105C. Note that color corrected color response 123 relates to device color vectors supplied as color corrected device input 143.

Based on color corrected color response 123, color management transforms (e.g. 107A-107F) can be produced to obtain color managed color response 133 for color managed device 131. Color management transforms 107A-107F can be embodied as multi-dimensional lookup tables for example. In particular, some of color management transforms 107A-107F can be ICC profiles or ICC device links. Color management transforms 107A-107F correct image data 100, supplied as color managed device input 144 to color managed device 131, so that color reproduced by color corrected device 121 is consistent with a user's intent. Note that image data 100, supplied directly as color corrected device input 143, includes colors defined by color corrected color response 123.

Color management transform 107A, for example, can correspond to a reverse model for color corrected device 121 so that CIELAB color vectors from image data 100 are transformed into CMY vectors for color corrected device 121. As another example, color management transform 107B can be an ICC device link that transforms color from an RGB gamut to the gamut of color corrected device 121. As another example, color management transform 107C can correspond to a forward model of a RGB gamut referenced by imaged data 100 and color management transform 107D can correspond to a reverse model for color corrected device 121. Color management transform 107D can be calculated, for example, from a characterization or prediction of color corrected color response 123.

As another example, color management transform 107E can correspond to a spot color recipe, providing a device color vector for a particular tone of a named color. Other transformations can accomplish the same result as described below.

As another example, color management transform 107F can be used to correct input to color corrected device 121 so that color managed color response 133 provides a different device response (e.g. a customized response for color corrected device 121). The custom intent for the associated device condition can be considered an emulation condition. Note that an emulation condition can be extended to include other emulation transforms. For example, color corrected device 121 could be treated as a basic device for emulation purposes. This would allow emulating different tonal responses using tone correction transforms 105A-105C to supply inputs to color corrected device 121 as an example.

One skilled in the art will realize that other correction transform arrangements and device abstractions are possible including arbitrary arrangements of single-channel and multi-channel corrections transforms. Further, correction transform arrangements for capture devices are based on device outputs, rather than device inputs.

Figure 2:
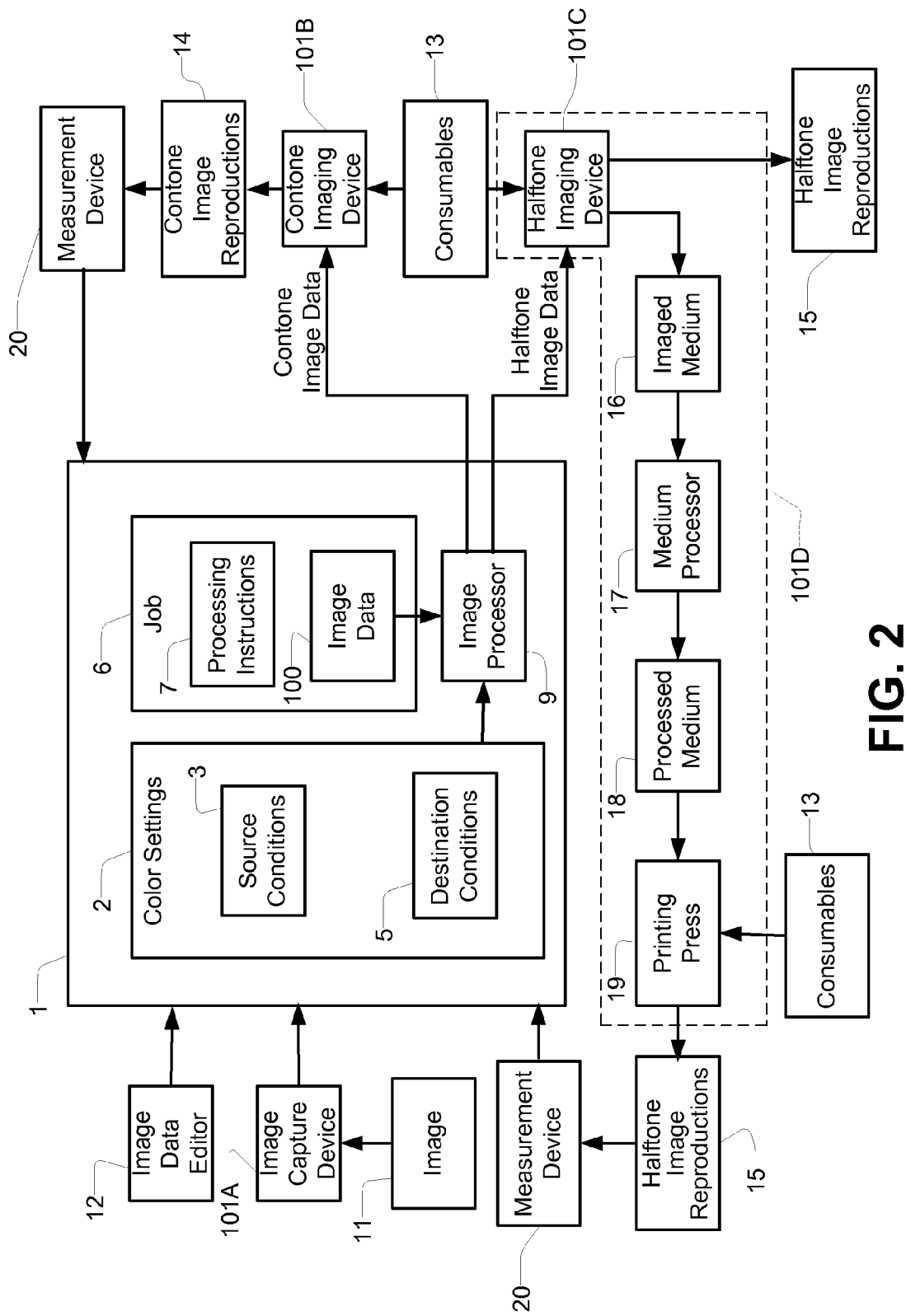
FIG. 2 is a block diagram of an exemplary graphic arts workflow system according to the present invention.

FIG. 2 is a block diagram of an exemplary graphic arts color workflow system 1 according to the present invention. Color workflow system 1 includes color settings 2 and job information 6 which includes job processing instructions 7 and image data 100. In some embodiments, color settings 2 may form a part of job information 6. Image processor 9 performs a variety of graphic art workflow tasks based on job processing instructions 7. Tasks can include, for example, pre-flight, trapping, color correction, imposition and preparation of image data for proofing or final reproduction. In some embodiments, image processor 9 comprises a plurality of processors in communication with each other to share the processing tasks.

Image data 100 may be acquired, for example, by image processor 9 from an external source such as a file or stream of data produced by an image data editor 12. As another example, image data 100 may be obtained by capturing an image 11 with an image capture device 101A (e.g. scanner or camera). Color workflow system 1 associates image data 100 with a device condition identified as a source condition 3, selected from amongst a plurality of source conditions 3. Source condition 3 may be determined explicitly, based on capture device 101 or information associated with image data 100. Source condition 3 may be determined implicitly (e.g. an expectation of the image data creation process). Source condition 3 can be associated with information about the response of device 101 that captured the image or information about the gamut associated with image data 100 based on the software or system that produced the data.

Color workflow system 1 may retain image data 100 in its original form (e.g. data format, color values) or may modify the form based on job processing instructions 7 to produce a replacement or new copy of image data 100. For example, raster image data 100, associated with source condition 3, may be converted into a different format (e.g. Adobe® PDF) with color corrected by image processor 9 for a device condition identified as a destination condition 5 based on job processing instructions 7. Destination condition 5 can be associated with information about the device response of device 101, which may have been selected for reproducing image data 100. For example, RGB color values in original image data 100 may be converted to CMYK color values for destination condition 5 associated with printing device 101.

An exemplary destination device 101D is depicted with a dashed outline, representing an abstraction of an offset or flexographic printing process depicted as a series of equipment and the articles they consume and process. The exemplary printing process includes a halftone imaging device 101C which produces a set of imaged medium 16 (e.g. printing plates) from consumables 13 (e.g. blank plates) and halftone image data produced by image processor 9. Imaged medium 16 is then processed by medium processor 17 (e.g. plate developer) to become processed medium 18 which is mounted on printing press 19 for use with consumables 13 (e.g. ink and paper) to produce a set of halftone image reproductions 15.

Image data color values, corrected based on information associated with source condition 3 and destination condition 5, produce reproduction colors on destination device 101D that approximate the source colors within the limits of destination device 101D. In some embodiments of color workflow system 1, one or more aspects of image data 100 conversion are deferred to allow greater flexibility in processing (e.g. selection of destination device 101D) and prevent unnecessary loss of information (e.g. gamut compression).

Color workflow system 1 may also generate reproductions of image data 100 on a variety of destination devices 101 (e.g. inkjet or monitor devices). Image processor 9 can correct color values of image data 100 based on destination conditions 5 associated with the corresponding destination devices 101. Destination condition 5 can be associated with information about the response of destination device 101.

Other exemplary destination devices 101B and 101C are also depicted. Contone imaging device 101B represents a color monitor, for example, which can produce a virtual proof based on continuous tone data produced by processor 9. Other types of continuous tone reproduction devices, such as continuous tone printers, are also possible. Halftone imaging device 101C represents a halftone printing device, such as a platesetter, inkjet, electrostatic or ablative printing device.

Image processor 9 can, for example, correct color values of image data 100 associated with source condition 3 for use with destination condition 5. Color corrected this way provides reproduction colors that approximate the source colors within the limits of contone imaging device 101B, for example. As one alternative, image processor 9 can correct color values of image data 100 associated with source condition 3 for use with a secondary destination condition based on a primary destination condition 5. Color corrected in this way provides reproduction colors on contone imaging device 101B that approximate the color which would be produced by primary destination device 101D, within the limits of secondary contone imaging device 101B, for example.

FIG. 2 also depicts exemplary measurement devices 20 which can be used by color workflow system 1 to characterize a color response of reproduction devices 101B-101D by measuring contone image reproduction 14 and halftone image 15 or imaged medium 16 and processed medium 18. A reference image 11, with known colors, can be used to characterize a color response of image capture device 101A.

Figure 3:
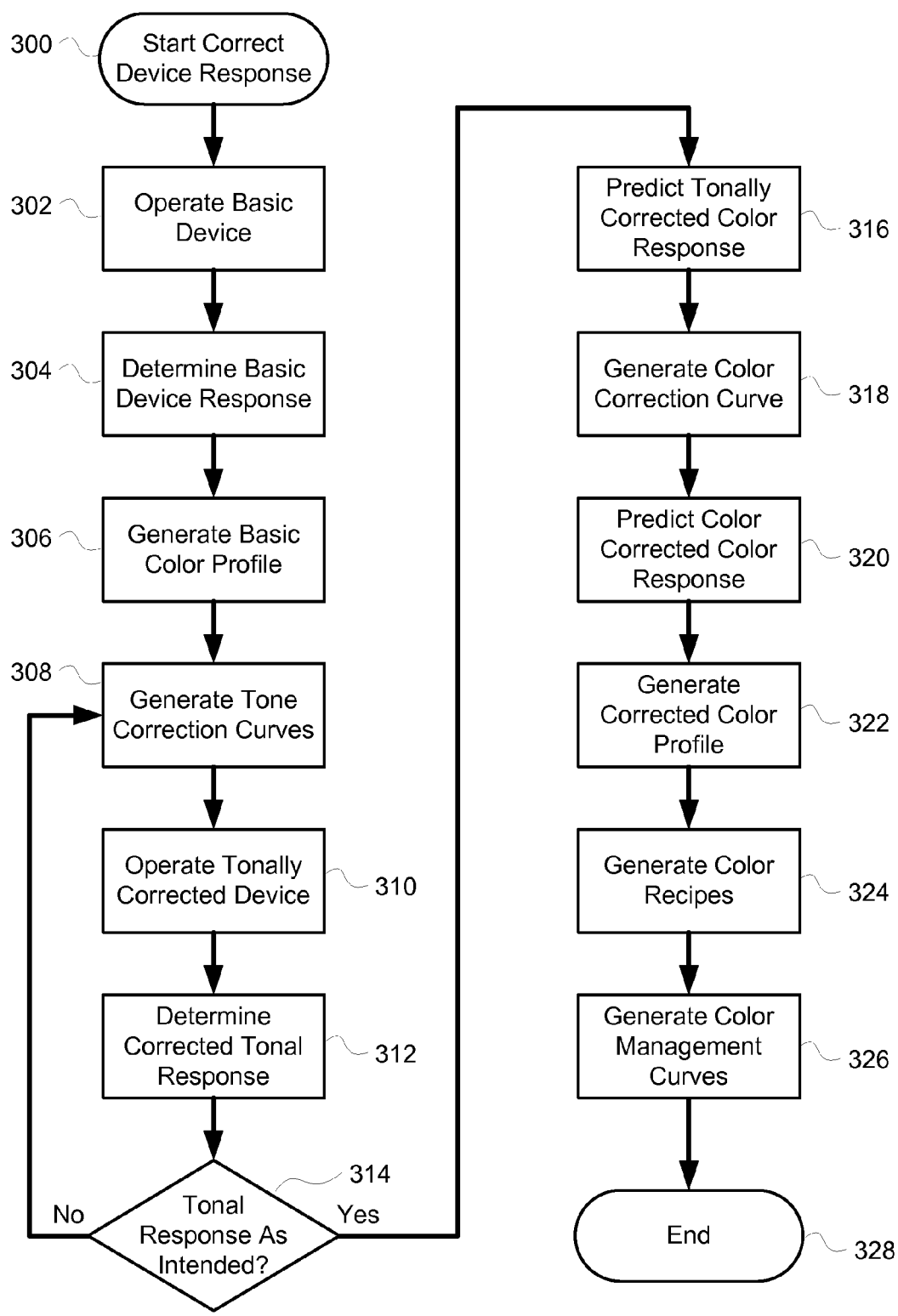
FIG. 3 is a flow chart diagram of an exemplary method for correcting a device response according to the present invention.

FIG. 3 is a flow chart diagram of a method for correcting a device response according to the present invention. The method starts at block 300 when a new device source condition 3 or destination condition 5 is created by color workflow system 1. In general, a unique set of attribute values or range of values can define a device condition having an associated device response. As seen in FIG. 1, a number of device responses, corresponding to different perspectives, may be associated with a device condition for a device 101.

The method proceeds to block 302 where color workflow system 1, either automatically or with user guidance, operates basic device 101 with a test image. For clarity, assume that device 101 is a reproduction device, which at this block produces a first reproduction. Further assume that no correction transforms were used for the first reproduction. At block 304, color workflow system 1 uses measurement device 20 to determine a basic device response from the first reproduction. The basic device response includes at least basic tonal response 102 and basic color response 103. Basic color response 103 can then be used to derive at least a forward model based on measured values.

The method proceeds to block 306 where system 1 optionally generates a basic color profile based on basic color response 103. In preferred embodiments, the basic color profile includes samples of at least a forward model and a reverse model. In some embodiments, creation of a color profile can be deferred until a corrected color response has been determined since that is most likely the color profile that will be used for color management.

The method proceeds to block 308 where a first set of tone correction transforms 105A-105C are generated so that tonally corrected device 111 will have an intended tonal response. Color workflow system 1 can optionally operate tonally corrected device 111 using the same test form at block 310 and measure the resulting reproduction at block 312 to determine corrected tonal response 112. At block 314, corrected tonal response 112 can be compared with the intended response to identify whether tone correction transforms 105A-105C need adjustment at block 308 or whether the method can proceed to block 316. Multiple iterations of tone correction may be performed until corrected tonal response 112 is sufficiently accurate or to reach a compromise between competing tonal objectives.

Proceeding at block 316, color workflow system 1 predicts tonally corrected color response 113 based on the forward model associated with basic color response 103 and tone corrections transforms 105A-105C. In particular, a set of prediction transforms can be created based on transforms 105A-105C. In the example case, where no tone correction transforms were used for the first reproduction, the prediction transforms are the same as transforms 105A-105C. The prediction transforms can be applied to test device color vectors supplied as tonally corrected device input 142. The modified test vectors are used as indices into the forward model associated with basic color response 103 to predict tonally corrected color response 113 for tonally corrected device input 142. As described in greater detail below, the forward model of basic color response 103 produces measured and interpolated values, so the accuracy of the prediction depends, in part, on the accuracy of the interpolated values. Test vectors and/or interpolation methods can be selected accordingly.

If basic color response 103 was measured while operating with nominal tone correction transforms, prediction transforms and predicted tonally corrected color response 113 must also be based on the nominal tone correction transforms. This is described in more detail below.

Next, the method proceeds to block 318 where, if it is required, color correction transform 106 is generated based on the predicted tonally corrected color response 113. For this block, tonally corrected color response 113 will also need an associated reverse model. The method then can, for example, with a forward model for an idealized device and the predicted reverse model for tonally corrected device 111, determine the predicted device color vector, supplied as tonally corrected device input 142, whose reproduction on tonally corrected device 111 will approximate the device independent color reproduced for a test vector on color corrected device 121 (e.g. the idealized device). Color correction transform 106 can then be generated based on the predicted and test vectors and may also include interpolated values.

Next, the method proceeds to block 320 where, if a color correction transform 106 was created, color workflow system 1 predicts color corrected color response 123 based on tonally corrected color response 113 and color correction transform 106, for example. Prediction in this case involves applying the same principle described above to locate a device-independent color value using a prediction transform. In this example a prediction transform is multi-dimensional and can be applied to a test vector supplied as color corrected device input 143. Identifying the device-independent color value for the test vector involves transforming it into a predicted vector consistent with tonally corrected device input 142 and using the forward model associated with tonally corrected color response 113 to identify the device-independent color. As above, the accuracy of predicted color corrected color response 123 depends on the accuracy of interpolated values in color correction transform 106 and tonally corrected color response 113.

Next, the method proceeds to block 322 where a corrected color profile for color corrected device 121 can be generated. This includes adapting an earlier profile (e.g. at block 306) or at least generating a reverse model for color corrected device 121 based on the predicted color corrected color response 123.

Next, at block 324, color workflow system 1, either automatically or under the guidance of a user, can generate spot color recipes for the new device condition. Recipes, which can also be included in color settings 2, specify device color vectors required to reproduce a named color at a particular tint for a device condition. Named colors can be selected, for example, from a color database included in color settings 2. The color database can specify device-independent color values for at least one tint of the named color and provide a means for identifying color values for other tints. Named color recipes can then be determined for color corrected device 121 by using the associated reverse model to identify the device-dependent color vector that will produce the device-independent color values identified for the tint of the named color identified in the color database.

Next, at block 326, color workflow system 1, either automatically or under the guidance of a user, can generate color management transforms 107A-107F. As an example, a device link may be required based on a color setup map (see FIG. 11), defined by a user as part of color settings 2 and described further below, which identifies a valid color workflow including transformations between device conditions which include the newly created device condition. As another example, color workflow system 1 may automatically generate new color setup maps including the new condition if existing maps include conditions which are sufficiently similar to the newly created condition (e.g. the new condition is the same as an existing mapped condition except for paper type).

Next, the method proceeds to block 328 where the method ends. Note that the method of FIG. 3 can be repeated if there is reason to believe that the basic device response for device 101 has changed for an existing condition. In this scenario, for example when environmental conditions have changed, the characterizing reproduction run may use existing (now nominal) tone correction transforms 105A-105C. Thus, the method can automatically generate or update device responses, correction transforms and other dependent color settings based on a single measured device response and one or more predicted device responses.

FIGS. 4-8 illustrate a detailed example of the aspects of the present invention described above.

Figure 4:
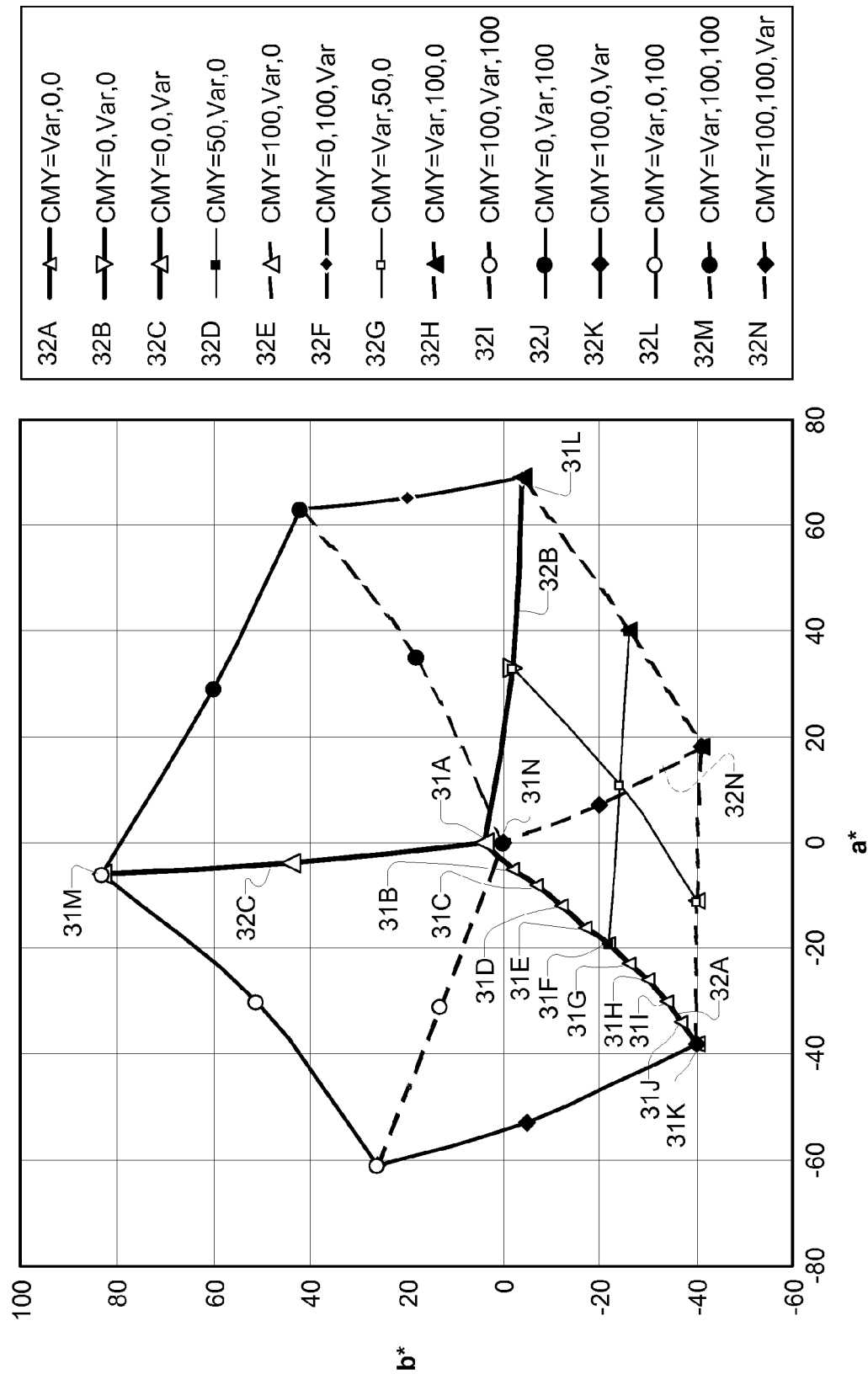
FIG. 4 is a diagram illustrating part of an exemplary basic color response for a selection of first color vectors for an exemplary printing device.

FIG. 4 is a diagram illustrating part of an exemplary basic color response 103 for a selection of device color vectors for an exemplary reproduction device 101. In particular, a set of device-independent color coordinates 31 are depicted on the plane defined by the a* and b* axis of the CIELAB color space. For simplicity, the L* axis is not shown.

Device-independent color coordinates 31 can been determined, for example, by color workflow system 1 using measurement device 20 on halftone image reproduction 15. Halftone image reproduction 15 was produced, for example, on basic device 101 from device-dependent color vectors for cyan, magenta and yellow (CMY) colorants, supplied as device input 141 (i.e. no correction). Table 1 identifies an exemplary set of color coordinates 31A-31K corresponding to printed color vectors. Coordinates 31A-31K with corresponding reference numbers on FIG. 4 are identified.

TABLE 1

| Color Vector | | | Color Coordinate | | | Reference |
|---|---|---|---|---|---|---|
| C | M | Y | L* | a* | b* | Numeral |
| 0.0 | 0.0 | 0.0 | 89 | 0 | 4 | 31A |
| 0.1 | 0.0 | 0.0 | 84 | −5 | −2 | 31B |
| 0.2 | 0.0 | 0.0 | 80 | −8 | −7 | 31C |
| 0.3 | 0.0 | 0.0 | 77 | −12 | −12 | 31D |
| 0.4 | 0.0 | 0.0 | 73 | −16 | −17 | 31E |
| 0.5 | 0.0 | 0.0 | 70 | −19 | −22 | 31F |
| 0.6 | 0.0 | 0.0 | 67 | −23 | −26 | 31G |
| 0.7 | 0.0 | 0.0 | 64 | −26 | −30 | 31H |
| 0.8 | 0.0 | 0.0 | 61 | −30 | −34 | 31I |
| 0.9 | 0.0 | 0.0 | 58 | −34 | −37 | 31J |
| 1.0 | 0.0 | 0.0 | 56 | −38 | −40 | 31K |
| 0.0 | 0.5 | 0.0 | 66 | 33 | −2 | |
| 0.5 | 0.5 | 0.0 | 51 | 11 | −24 | |
| 1.0 | 0.5 | 0.0 | 41 | −11 | −40 | |
| 0.0 | 1.0 | 0.0 | 47 | 69 | −4 | 31L |
| 0.5 | 1.0 | 0.0 | 35 | 40 | −26 | |

TABLE 1-continued

| Color Vector | | | Color Coordinate | | | Reference |
|---|---|---|---|---|---|---|
| C | M | Y | L* | a* | b* | Numeral |
| 1.0 | 1.0 | 0.0 | 26 | 18 | −41 | |
| 0.0 | 0.0 | 0.5 | 86 | −4 | 44 | |
| 0.5 | 0.0 | 0.5 | 67 | −27 | 16 | |
| 1.0 | 0.0 | 0.5 | 53 | −53 | −5 | |
| 0.0 | 0.5 | 0.5 | 64 | 30 | 29 | |
| 0.5 | 0.5 | 0.5 | 50 | 4 | 6 | |
| 1.0 | 0.5 | 0.5 | 39 | −24 | −12 | |
| 0.0 | 1.0 | 0.5 | 47 | 65 | 20 | |
| 0.5 | 1.0 | 0.5 | 34 | 38 | −3 | |
| 1.0 | 1.0 | 0.5 | 25 | 7 | −20 | |
| 0.0 | 0.0 | 1.0 | 84 | −6 | 83 | 31M |
| 0.5 | 0.0 | 1.0 | 66 | −30 | 51 | |
| 1.0 | 0.0 | 1.0 | 52 | −61 | 26 | |
| 0.0 | 0.5 | 1.0 | 63 | 29 | 60 | |
| 0.5 | 0.5 | 1.0 | 49 | 2 | 33 | |
| 1.0 | 0.5 | 1.0 | 38 | −31 | 13 | |
| 0.0 | 1.0 | 1.0 | 47 | 63 | 42 | |
| 0.5 | 1.0 | 1.0 | 34 | 35 | 18 | |
| 1.0 | 1.0 | 1.0 | 25 | 0 | 0 | 31N |

FIG. 4 also depicts color curves 32A-32N for coordinates 31. Curves 32A-32N represent a range of color vectors where one device-dependent colorant value is varied while the other two are held constant. For example, curve 32A illustrates cyan colorant being varied from 0 to 100% tint while magenta and yellow colorants are not printed (0% tint). Curves 32A-32N lie on the surface of the color gamut of device 101. Note that other color curves 32A-32N can be identified where more than one colorant value is varied.

Coordinates 31A-31K correspond to points on curve 32A at 10% increments of cyan colorant. Coordinates 31A-31K, identified by measurement, in association with their corresponding color vectors, form part of the forward model for basic device 101. Other coordinates 31A-31K can be computed (e.g. by interpolation) and form another part of the forward model. In a preferred embodiment, the set of measured coordinates 31A-31K are distributed throughout the gamut of device 101 in a manner that reduces errors when estimating coordinates 31A-31K for an arbitrary color vector.

Figure 5:
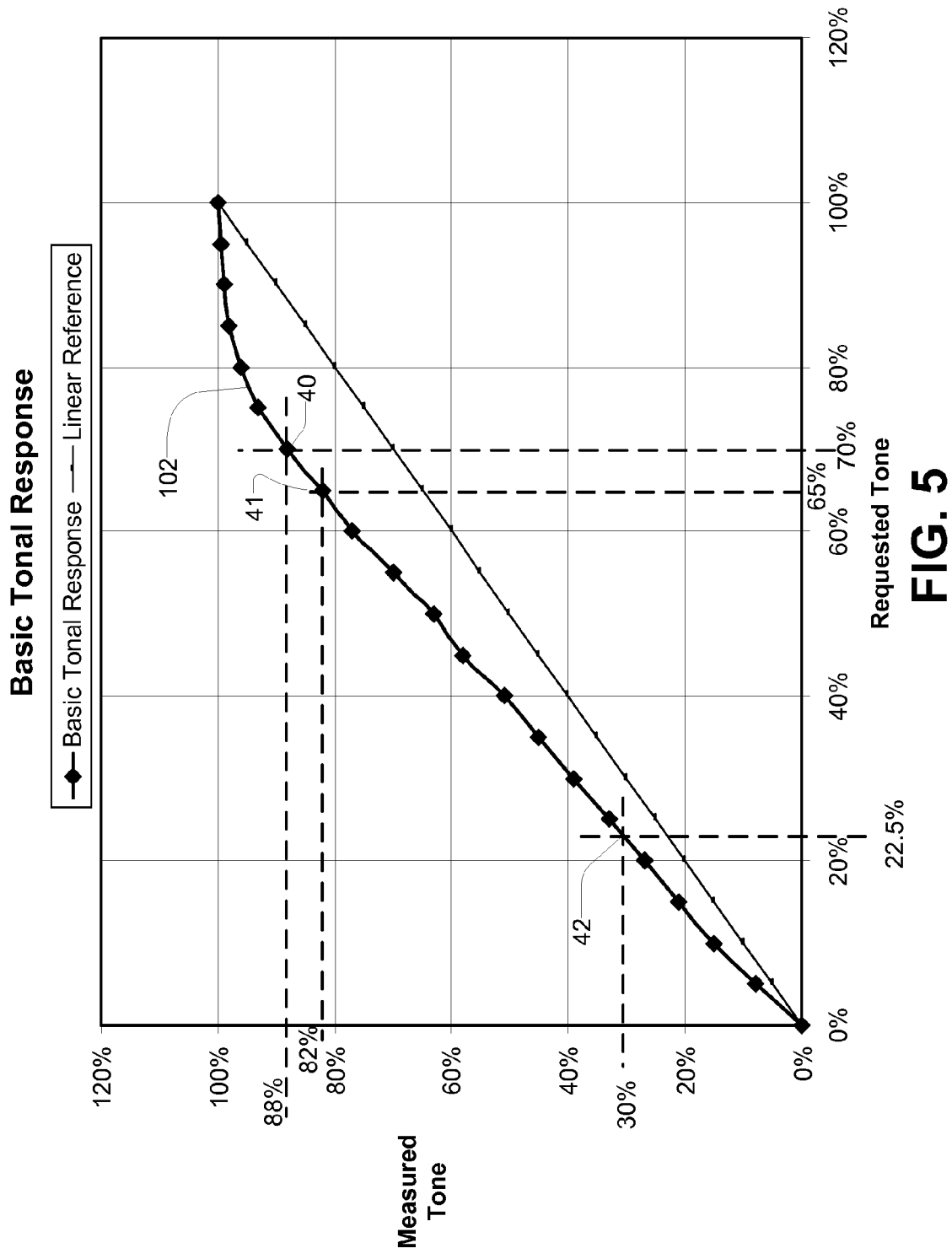
FIG. 5 is a diagram illustrating an exemplary basic tonal response for one channel of an exemplary printing device.

FIG. 5 is a diagram illustrating an exemplary basic tonal response 102 for basic device 101. Assume that basic tonal response 102 includes measured data points for the cyan colorant for device 101. A representative measured data point 40 indicates that an actual tone of 88% was measured for an area of reproduced image 15 when a 70% tone was supplied as device input 141. Another measured data point 41 indicates that an 82% actual tone was reproduced when a 65% tone was supplied as device input 141. Basic tonal response 102 includes other measured data points shown with diamond markers for 5% increments of requested tone. Other actual tone values can be estimated by interpolating between measured data points. For example, an estimated data point 42 indicates that to reproduce a 30% actual tone, a 22.5% tone should be supplied as device input 141.

Figure 6:
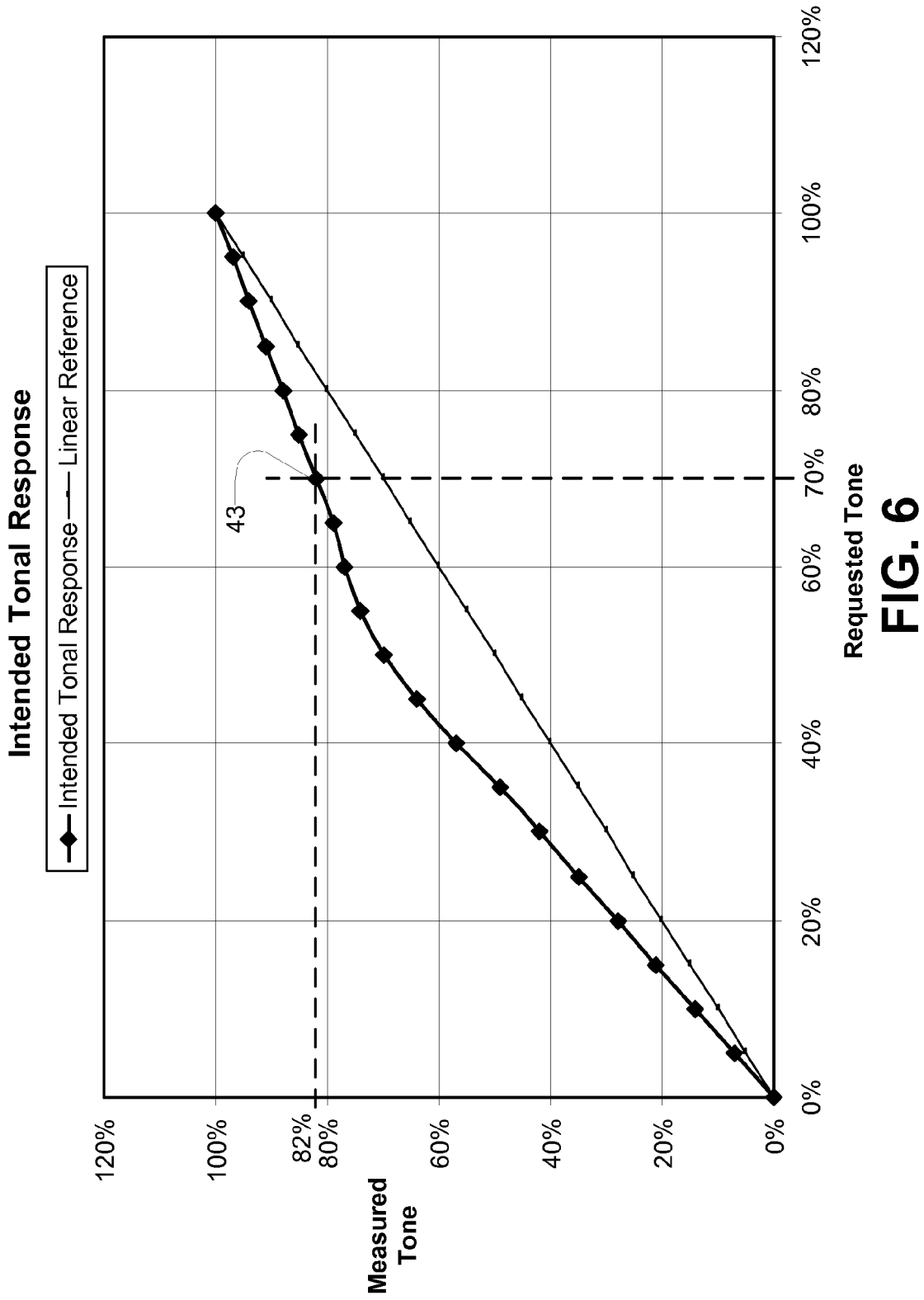
FIG. 6 is a diagram illustrating an exemplary intended tonal response for one channel of an exemplary printing device.

FIG. 6 is a diagram illustrating an exemplary corrected tonal response 112 for tonally corrected device 111 after generating appropriate correction transforms 105A-105C. In other words, corrected tonal response 112 is the intended tonal response for the cyan colorant for tonally corrected device 111. Similar to FIG. 5, FIG. 6 depicts corrected tonal response 112 as a transform whose points represent the actual tone reproduced for a tone supplied as tonally corrected device input 142. For example, point 43 indicates that when a 70% tone is supplied as tonally corrected device input 142, an actual tone of 82% should be reproduced.

Figure 7:
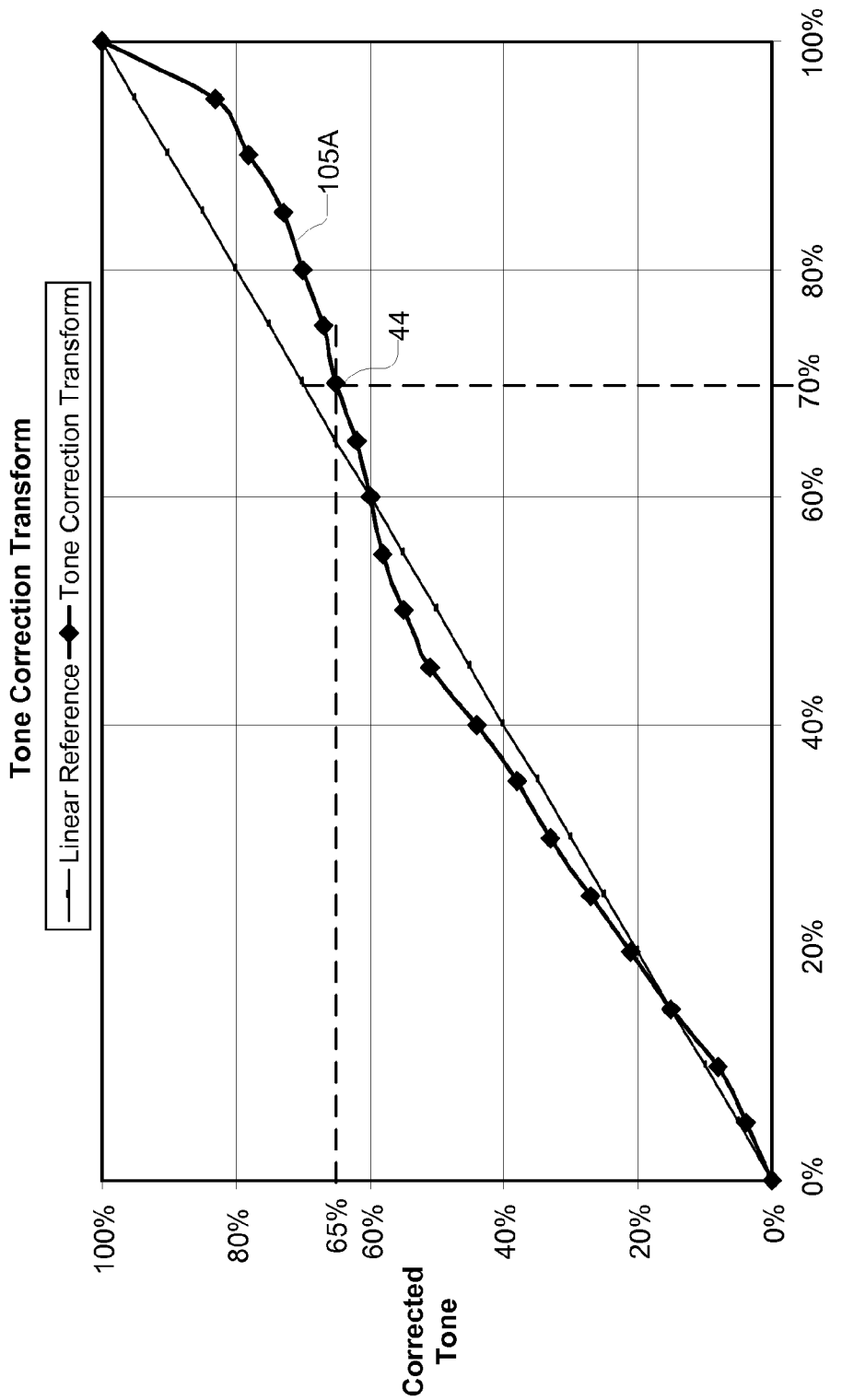
FIG. 7 is a diagram illustrating an exemplary tone correction transform for an exemplary printing device.

FIG. 7 is a diagram illustrating an exemplary tone correction transform 105A for device 101. Tone correction transform 105A identifies a corrected tone value (device input 141) based on a requested tone value (tonally corrected device input 142). Points on transform 105A are derived from basic tonal response and the intended tonal response. For example, point 44 indicates that a value of 70% on input 142 should be corrected to 65% on tonally corrected device input 141 since the intended actual tone value of 82% (point 43) is reproduced by basic device 101 when the input 141 has a value of 65% (point 41). In this example, the cyan prediction transform is the same as the cyan tone correction transform 105A.

Figure 8:
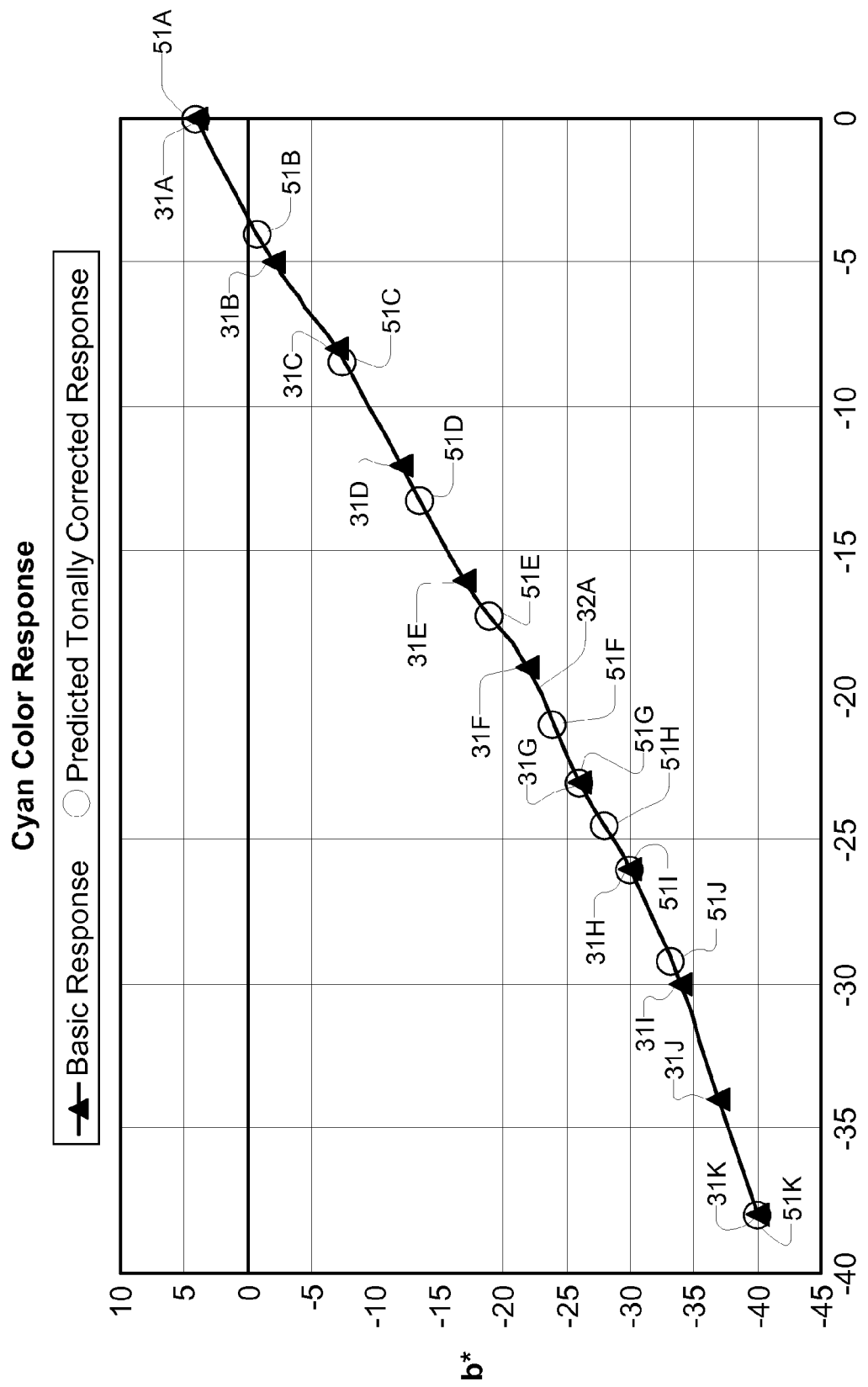
FIG. 8 is a diagram illustrating a predicted color response for an exemplary printing device according to the present invention.

FIG. 8 is a diagram illustrating an exemplary prediction of tonally corrected color response 113 according to the present invention. For simplicity, only a portion of tonally corrected color response 113 is illustrated. The portion corresponds to color vectors on the cyan-only color curve 32A. Those skilled in the art will realize that color vectors including non-zero values for the other colorants can also be represented by a color curve 32A lying elsewhere on the surface or interior of the color gamut.

As a reference, curve 32A from basic color response 103 is depicted with measured coordinates 31A-31K marked as triangles. Predicted color coordinates 51A-51K for tonally corrected color response 113 are illustrated as circles and correspond to tonally uncorrected color vectors, supplied as tonally corrected device input 142 at 10% increments. In this example, a predicted color coordinate 51A-51K can be determined for a color vector on tonally corrected device input 142 by applying tone correction transforms 105 to obtain a corrected color vector. The corrected color vector can then be used to identify color coordinates from the forward model associated with basic color response 103.

For example, a color vector on tonally corrected device input 142 specifying a 70% cyan tint will be corrected to a cyan tint of 65% (see FIG. 7) before being provided as device input 141 to basic device 101. The predicted color response 51H, corresponding to 70% cyan tint, can therefore be estimated by finding the color coordinate for the 65% tint from the forward model derived from basic color response 103. Given the simplistic case of only cyan colorant, the value can be estimated visually from curve 32A as the point 51H, which is mid way between 31G and 31H on curve 32A. Other predicted color coordinates 51A-51K can be derived based on tone correction transform 105 in a similar fashion and are tabulated in Table 2.

TABLE 2

| Cyan Tint (on input 142) | Cyan Tint (on input 141) | Coordinate References | Predicted a* | Predicted b* |
|---|---|---|---|---|
| 0% | 0% | 31A, 51A | 0.0 | 4.0 |
| 10% | 8% | 51B | −4.0 | −0.8 |
| 20% | 21% | 51C | −8.4 | −7.5 |
| 30% | 33% | 51D | −13.2 | −13.5 |
| 40% | 44% | 51E | −17.2 | −19.0 |
| 50% | 55% | 51F | −21.0 | −24.0 |
| 60% | 60% | 31G, 51G | −23.0 | −26.0 |
| 70% | 65% | 51H | −24.5 | −28.0 |
| 80% | 70% | 31H, 51I | −26.0 | −30.0 |
| 90% | 78% | 51J | −29.2 | −33.2 |
| 100% | 100% | 31K, 51K | −38.0 | −40.0 |

It is clear that some of the predicted color coordinates (e.g. 51G, 51I) may not be estimated values based on the forward model associated with basic color response 103 but may be measured values from basic color response 103. In practice, a forward model may be an abstract model that is based on and approximately fits measured values and thus color coordinates derived by the model may not be exactly as measured. It is also clear that the distance between color coordinates 51A-51K are different than the distance between color coordinates 31A-31K. In particular, the distance between 51J and 51K is more than twice the distance between 31J and 31K.

In some embodiments, a forward model, corresponding to tonally corrected color response 113, can be generated by associating a range of color vectors for tonally corrected device input 142 with predicted color coordinates 51A-51K. Depending on the smoothness of the color response of device 101 in a region of its gamut, it may be desirable to predict additional color coordinates 51A-51K where large distances exist (e.g. between 51J and 51K) so that the accuracy of the forward model derived from predicted color coordinates 51A-51K is adequate.

Given the detailed example above, a more general approach can be stated as follows. An existing forward model, generated for a reproduction device condition operating with a first set of correction transforms, can be adapted to predict a device-independent color coordinate for an input device color vector supplied to the same device condition but operating with a second set of correction transforms. The existing forward model can be adapted by applying a set of prediction transforms to the inputs of the existing forward model. A prediction of the reproduced color for the input vector, modified by the second set of correction transforms, can be identified by modifying the input vector with the set of prediction transforms and using the resultant vector to locate a device-independent color from the existing forward model.

The set of prediction transforms can be identified as the transforms that generate a second corrected vector from a first corrected vector, both based on a subject vector, wherein the first vector comprises the subject vector modified by a first set of correction transforms and wherein the second vector comprises the subject vector modified by a second set of correction transforms.

In the simple case detailed above, where the first set of transforms are identity transforms (i.e. no correction), the set of prediction transforms are the same as the second set of transforms.

The set of prediction transforms can include tone correction transforms 105A-105C, color correction transforms 106 or other transforms in other concatenated arrangements. In one embodiment, an existing color profile, generated for a device condition and operating with a first set of correction transforms, is modified by including the prediction transforms. In particular, the transforms are applied as "A curves" in the "A2B" portion of an ICC profile. The modified profile can then be used with for the same device condition when operating with the second set of correction transforms.

According to one embodiment, an existing reverse model, generated for a device condition operating with the first set of correction transforms can also be adapted to predict a color vector for an input device-independent color coordinate for the same device condition but operating with the second set of correction transforms. The reverse model can be adapted by applying a set of prediction transforms to the outputs of the reverse model. The reverse model prediction transforms are the inverse of the forward model prediction transforms and can be incorporated into "A curves" in a "B2A" portion of an ICC profile.

The above description details the invention as it applies to a reproduction device. For a capture device the process is similar but, in many respects, with an inverted sense (e.g. mirror image of FIG. 1 with inputs changed to outputs). For example, basic capture device 101 produces basic device outputs including device color vectors corresponding to areas of a captured sample image having specific color coordinates. Tone correction transforms 105A-105C modify basic device outputs to produce tonally corrected outputs corresponding to tonally corrected device 111. Basic color response 103 can be used to generate a reverse (i.e. device-independent to device-dependent color) model based on capture of known color coordinates from a sample image.

Figure 9:
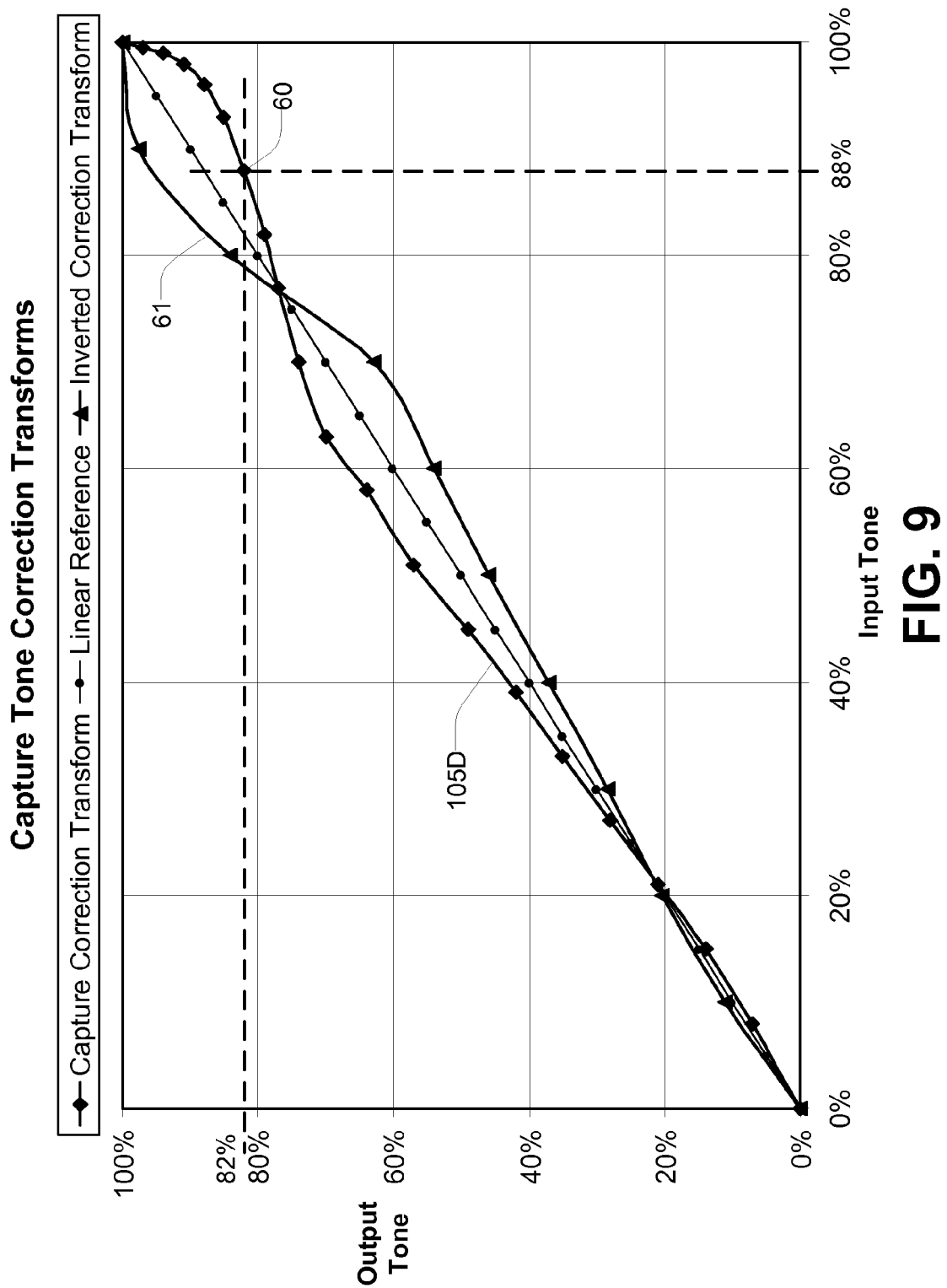
FIG. 9 is a diagram illustrating exemplary tone correction transforms for an exemplary capture device.

As an example, assume that an exemplary image capture device 101A has a basic response corresponding to the values in Table 1. Although most capture devices would provide red, green and blue color outputs, the values in Table 1 are sufficiently illustrative of the concept even though RGB colors are additive and CMY colors are subtractive. In this case, device-independent color coordinates are known colors (e.g. perhaps a neutral color tone ramp which is different than the values in table 1) of a sample image 11 and color vectors are basic device outputs. Assume, for simplicity, that FIG. 5 also represents a tonal response for one device color of image capture device 101A with the horizontal axis representing the tonality of the captured image and the vertical axis representing the tonal output for a given color channel. Also assume, for simplicity, that FIG. 6 represents the intended tonal response with the capture device axis meanings as above. Tone correction transform 105D of FIG. 9 represents the modifications that must be made to one of the basic device color outputs so that the output satisfies the intended tonal response. For example, tonally corrected device 111, when capturing a subject image with a 70% neutral intensity, should produce an intended 82% output color value for a given color channel. But, basic device 101 outputs an 88% color value. Tonally corrected output (82%) can thus be determined based on transform 105D (e.g. point 60 of FIG. 9).

Tonally corrected color response 113 for the capture device can be predicted based on a correction transform derived from tone correction transforms 105A-105D. The reverse model corresponding to basic color response 103 can be adapted to predict the reverse model corresponding to tonally corrected color response 113. In the simple case, where no tone correction transform 105A-105D was used, tone correction transform 105A-105D can be used as a prediction transform to adapt the reverse model.

A forward model for the capture device can be produced by inverting the corresponding reverse model. The forward model corresponding to basic color response 103 can be adapted by using a prediction transform that corresponds to inverted tone correction transform 61.

Figure 10:
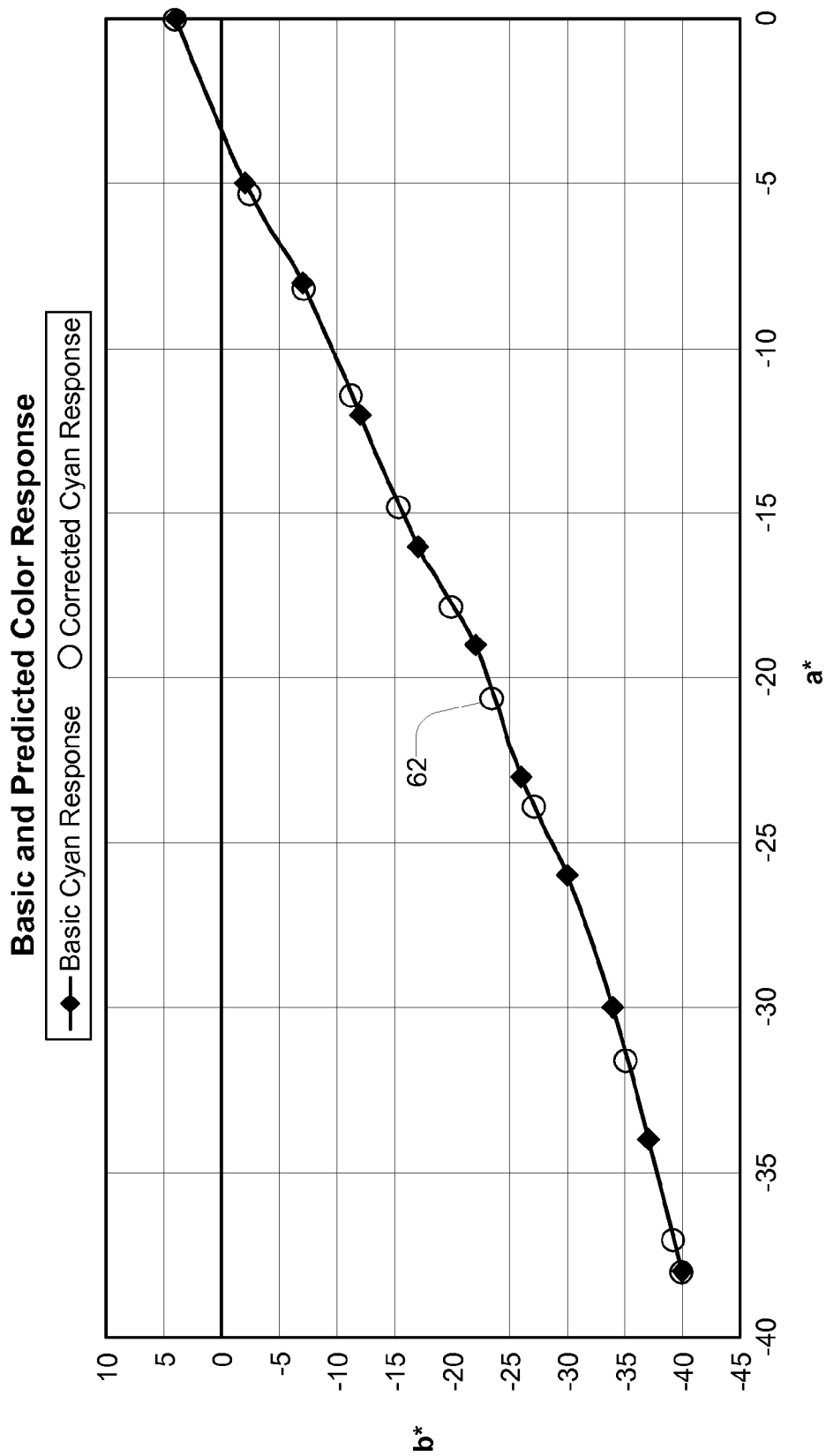
FIG. 10 is a diagram illustrating a predicted color response of an exemplary capture device.

FIG. 10 is a diagram illustrating a predicted color response of an exemplary image capture device 101A. The color curve represents the forward model of pure output of one color corresponding to basic color response 103. Points on that curve, represented by diamonds, correspond to input image color coordinates that produce pure device color outputs on a given color channel at 10% increments. Points, represented by circles, correspond to predicted input color coordinates that would produce tonally corrected device pure color outputs on the given color channel at 10% increments.

Predicted color coordinates can be determined using inverted correction transform 61 (inverse of tone correction transform 105D) with a tonally corrected color value as input. The resulting basic (uncorrected) color value read as output from transform 61 can then be used to identify the color coordinate from the forward model corresponding to basic color response 103.

For example, inverted correction transform 61 identifies a basic output value of 54% for a tonally corrected value of 60%. From the color curve of FIG. 10, predicted color coordinate 62, represents a tonally corrected output value of 60%, which coincides with an uncorrected value of 54% (using transform 61) and has values of approximately $a^* = -20.6$ and $b^* = -23.6$ (determined by interpolation).

Figure 11:
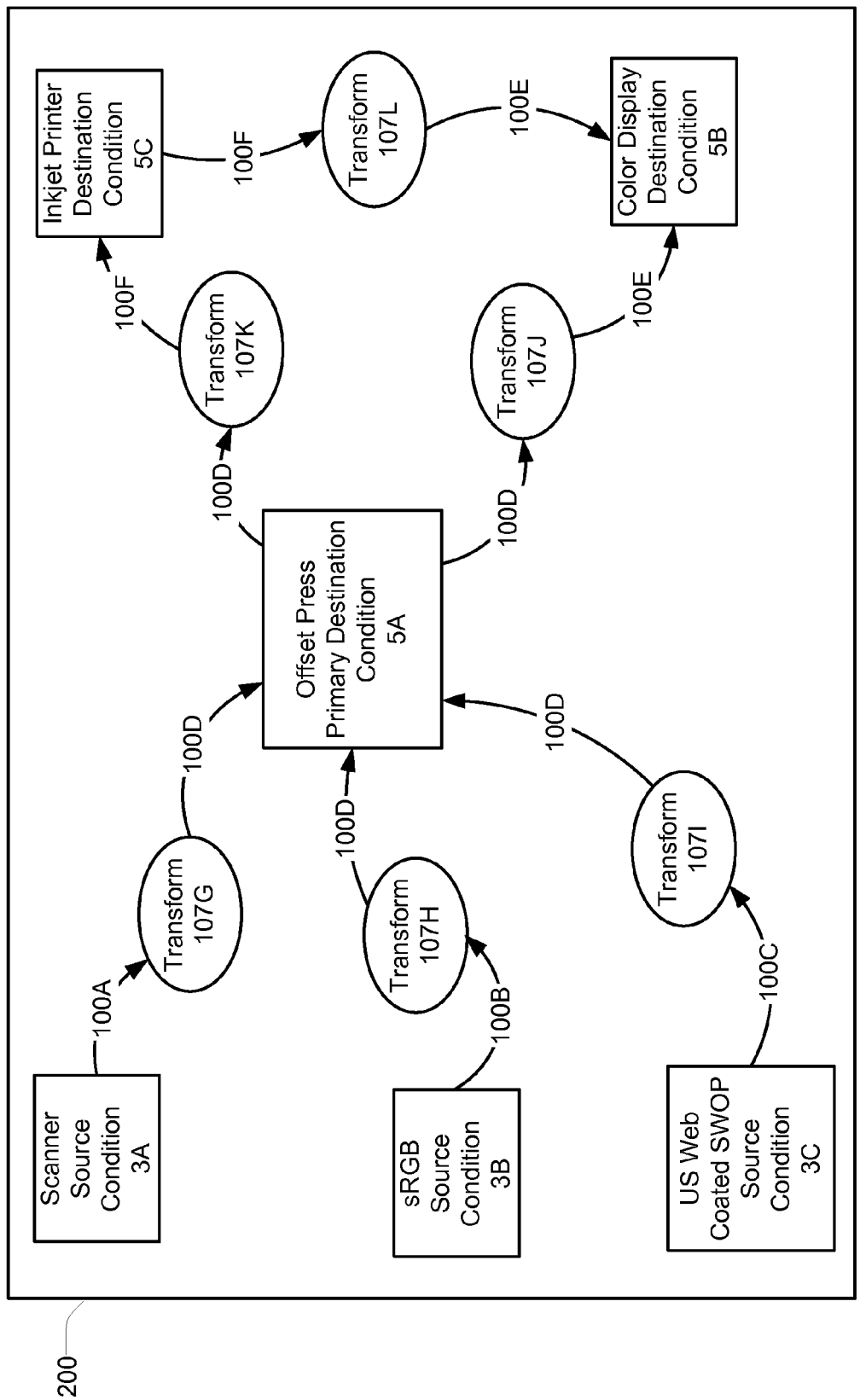
FIG. 11 is a diagram illustrating an exemplary color setup map according to the present invention.

FIG. 11 is a diagram illustrating an exemplary color setup map 200 according to the present invention. Color setup map 200 defines a range of possible sources and destinations for image data 100 available to a workflow and implicitly defines transforms applied to image data 100 intended for a destination. In a preferred embodiment, color setup map 200 is presented to the user with a graphical representation. However, it need not be graphically represented to be effective. When map 200 is created or modified, sources are specified as source conditions 3, identifying a particular device response associated with a source device providing image data 100. Source devices may be capture devices, reproduction devices (e.g. image data 100 prepared with a prepared with a printer in mind) or abstract devices as examples. Destinations are specified as destination conditions 5, identifying a particular device response for a particular operating condition associated with a destination device that will receive image data 100. Destination devices may typically be reproduction devices but may also be capture devices or abstract devices. As an example, a capture destination device may be used where image data 100 is being prepared for use by another system or workflow process that expects input from a capture device.

A primary destination can be defined which corresponds to a reproduction device intended to produce the agreed primary image reproduction. FIG. 11 illustrates exemplary primary destination condition 5A corresponding to an offset press (101D). The associated device response would normally be color corrected color response 123, though it may be possible to identify a different device response if more than one is associated with destination device 101D. Implicit color correction transforms 107G-107I respectively modify image data 100A-100C, associated with respective source conditions 3A-3C, into image data 100D based on the device responses identified for the source conditions 3A-3C and primary destination condition 5A. Image data 100D is supplied, for example, as input 143 to device 101D. As an example, RGB image data 100A, originating from scanner 101A, is transformed using a device link (transform 107G) into CMYK image data 100D. Note that a pair of device color profile transforms, similar to 107C and 107D can be used instead of transform 107G. Note also that a map 200 need not have source conditions 3 if image data 100 is prepared with primary destination condition 5A in mind.

Secondary destinations can also be defined, corresponding to other forms of reproduction that may be necessary as part of a workflow (e.g. hardcopy proof, softcopy proof, web document). FIG. 11 illustrates exemplary secondary destination conditions 5C (e.g. inkjet printer device 101C) and 5B (e.g. LCD monitor 101B). Secondary destinations can be defined to receive image data 100 transformed from a destination condition 5 identified by map 200. As illustrated, secondary destination conditions 5B-5C respectively receive image data 100E-100F, each of which is based on image data 100D and transformed respectively by color management transforms 107J and 107K. As an example, CMYK image data 100D, suitable for destination device 100D, is transformed using a device link (color management transform 107K) into CMYK image data 100F, suitable for color corrected device input 143 of halftone imaging device 101C. Together, color management transforms 107G and 107K enable halftone imaging device 101C to approximate the appearance of a halftone image reproduction 15 of image 11 produced from image data 100D on destination device 101D. Halftone image reproduction 15 from destination device 101D approximates the appearance of image 11 captured by image capture device 101A and expressed as image data 100A. In some embodiments, a single color management transform 107A can be created for efficiency that is equivalent to the concatenation of sets of transforms. For example, a different color management transform 107A, equivalent to 107G concatenated with 107K, can be created to map image data 100A directly into image data 100F.

In some cases it may be desirable for a secondary destination's reproduction to approximate the appearance of another secondary destination's reproduction instead of approximating the primary destination's reproduction. Exemplary color management transform 107L is created when contone imaging device 101B is intended to reproduce color which approximates halftone imaging device 101C color, which in turn approximates destination device 101D color, which in turn approximates the color of image 11 captured by image capture device 101A. This may be useful, for example to prevent proof price erosion when the gamut of contone imaging device 101B is wider than the gamut of halftone imaging device 101C but the price associated with a reproduction 15 from halftone imaging device 101C is higher than that of a halftone image reproduction 15 from contone imaging device 101B. Where multiple transformation paths for a secondary destination exist, selecting that destination may also require selection of the transformation path.

Creation of color setup map 200 can be accomplished through a variety of means including a graphical user interface showing the relationship between source/destination conditions 3A-3C and 5A-5C and either showing or implying correction transforms 107A-107L. Once created, color setup map 200 can be automatically maintained by color workflow system 1. If a device condition, or its associated device response, changes then all color settings 2 dependent on the changed entity can be automatically updated in each color setup map 200.

For example, assume destination condition 5C is referenced in three different color setup maps 200 and corresponding halftone imaging device 101C, upon periodic characterization of its device response, is found to have a changed color response. Color workflow system 1 can identify all dependent correction transforms associated with halftone imaging device 101C (e.g. device-centric transforms such as transform 105A-105D, 106, 107A and 107E, and map-related transforms such as transform 107J) and re-compute them.

In some situations, an actual device response may be different from its recorded device response. This may be detected by sampling outputs during production use, for example. If correction based on characterization is precluded, color workflow system 1 can allow a user to perform an estimated color and/or tonal correction for the device in an attempt to approximate its previously recorded device response. Re-characterization of a device response will need to be performed later and may preferably be performed using the previous correction transforms as nominal transforms. Color workflow system 1 can maintain a history on color settings 2 and can allow introduction of temporary corrections and reversion to earlier corrections as necessary. In addition, a history of recorded color corrections may provide useful information about the device or the individuals performing corrections.

Color setup map 200 provides additional improvements over the prior art by allowing an identified device condition to also include an emulation condition. This can allow, for example, a user to define a map-specific intent that differs from the standard transformation between characterized or predicted device responses. As an example, assume that the recorded device response of primary destination device 101D is defined according to a house standard for printing (e.g. FOGRA 30). However, for a specific job a different standard (e.g. FOGRA 39) is required. An emulation condition can be created, in association with primary destination condition 5A, to address this need. The emulation condition can be applied to an instance of color setup map 200 associated with the job. Emulation conditions can also be applied to secondary destination conditions to provide a customized response on their associated devices for color setup map 200.

Figure 12:
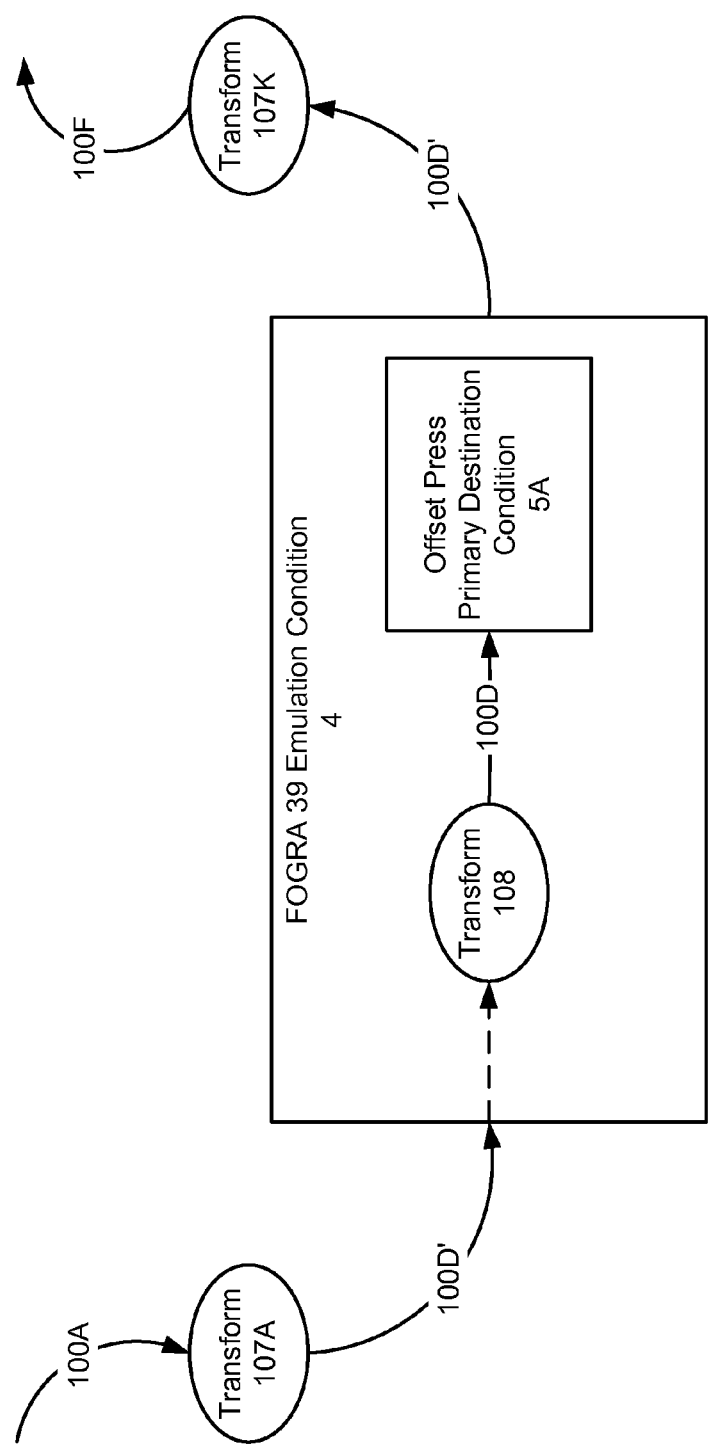
FIG. 12 is a diagram illustrating an exemplary emulation condition according to the present invention.

FIG. 12 illustrates an exemplary emulation condition according to the present invention. An emulation condition can be associated with any device condition. In the example of FIG. 12, FOGRA 39 emulation condition 4 is associated with primary destination condition 5A. Emulation condition 4 has a device response, based on the device response of destination condition 5A and emulation transform 108. Emulation transform 108 may include one or more specific transforms. For example, the transform model of FIG. 1 may be used where basic device 101 now corresponds to color corrected color response 123 for destination device 101D. Thus emulation transform 108 can include one or more of transforms 105A-105D, 106 and 107A-107L. Of course, other transformation models can be devised to embody an emulation condition 4.

In one embodiment, emulation transform 108 is defined by specifying a target and a method. A target can be selected from a known device condition or may simply be an identifying name. A method can be selected from a set of pre-defined methods or from user-defined methods. Pre-defined methods may identify the type of transformation method employed (e.g. color correction, tonal correction) and certain user preferences (e.g. gamut mapping preferences). A pre-defined method for a known device condition may allow color workflow system 1 to automatically generate emulation transform 108. A user-defined target or method can allow a user to define an arbitrary emulation transform 108.

Image data transformations occur in a manner similar to the previous descriptions. For example, image data 100A from source image capture device 101A is now modified by updated color management transform 107G into image data 100D' for destination device 101D, operating with destination condition 5A and emulation condition 4. Emulation transform 108 modifies image data 100D' into image data 100D which is then supplied to color corrected device input 143 of destination device 101D. Further, destination device 101C receives image data 100F which is modified by updated transform 107K based on image data 100D'. As above, creation or modification of an emulation condition can cause an automatic identification and/or re-computation of affected transforms.

Separating emulation transforms 108 from device condition transforms (e.g. color management transforms 105A-105D-107A-107L), reduces confusion, error and computing resource utilization. Without emulation transforms 108, a special-purpose copy of a device condition transform would need to be computed and could be mistakenly used in color setup maps 200 other than those intended.

Figure 13:
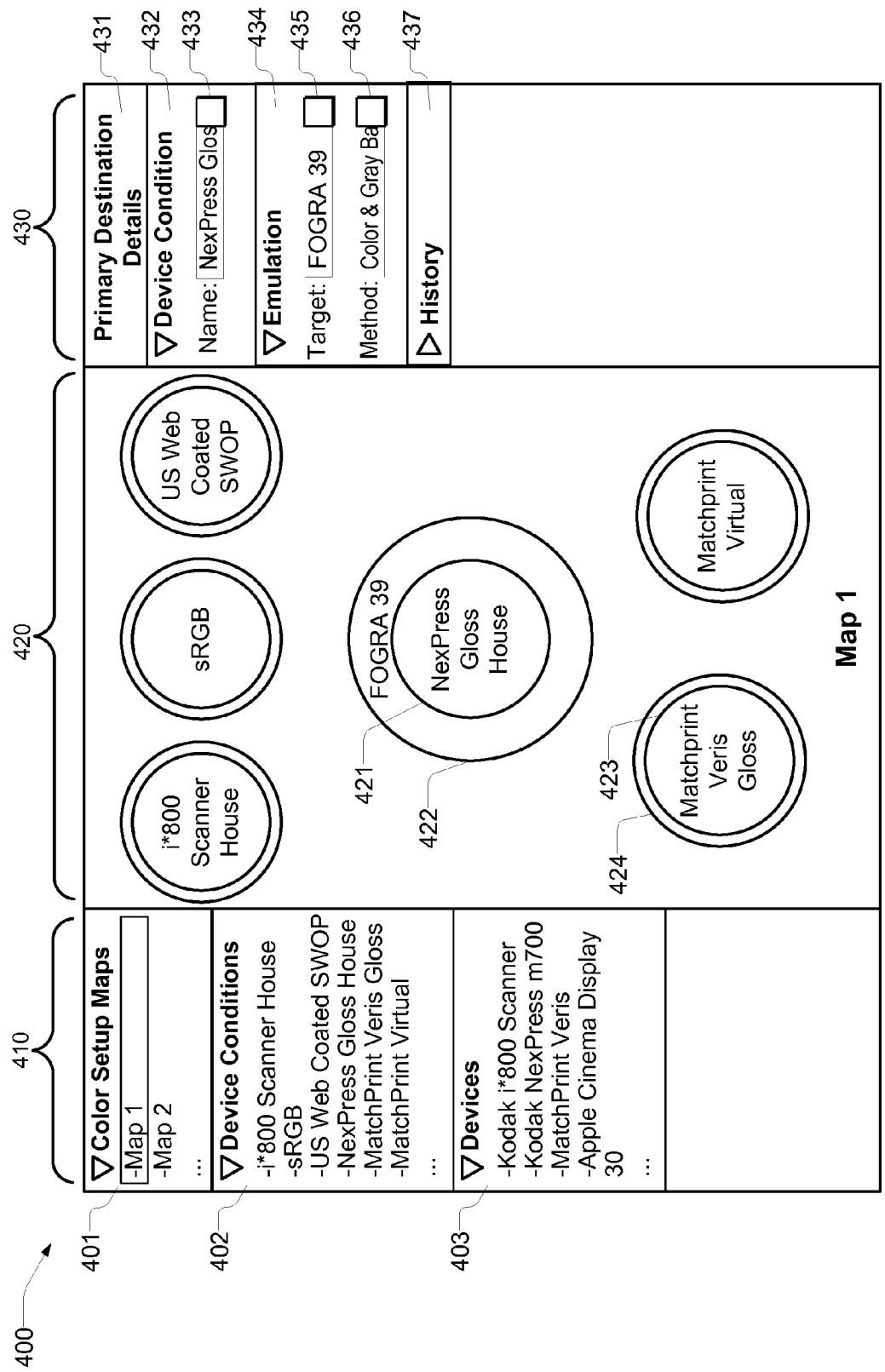
FIG. 13 is a diagram illustrating an exemplary user interface for managing color workflow.

FIG. 13 is a diagram illustrating an exemplary user interface 400 for managing color workflow. User interface 400 depicts a map view area 420 for viewing and/or configuring color setup maps 200. User interface 400 also includes exemplary color setup area 410 and exemplary element configuration area 430.

Map view area 420 graphically depicts symbolic representations of source conditions 3A-3C, destination conditions 5A-5C, and emulation conditions 4 that have been configured for a color setup map 200. Different types of conditions (i.e. source, primary destination and secondary destinations) are identifiable. This can be accomplished, for example, by spatial relationships (as shown), use of different symbols (not shown), and image data flows (not shown). Symbol 421 represents a primary destination condition for a NexPress printing device using gloss paper. Note that the symbolic name is merely an identifier and does not represent the complete list of constituent device condition attribute values. Symbol 422, shown as encapsulating symbol 421, represents a FOGRA 39 emulation condition for the primary destination condition. Symbol 423 represents a secondary destination condition for a Matchprint Veris inkjet proofing device using gloss paper. Symbol 424 represents a null emulation condition for the Matchprint Veris destination condition.

In some embodiments, map view area 420 can be configured to present different information. For example, one view could be configured to include only source and primary destination conditions. As another example, one view could be configured to show transforms and/or image data flows similar to FIG. 11 and FIG. 12.

To access a color setup map 200 in map view area 420, a user interacts with color setup map configuration area 401. For example, selecting an existing map "Map 1" results in map view area 420 being updated with a view of the corresponding color setup map 200.

To configure or use device conditions, a user interacts with device condition configuration area 402. For example, a user can create a new device condition, add an existing device condition to the current color setup map 200 presented in map view area 420 or delete a device condition from color workflow system 1. Device condition configuration area 402 may be pre-populated with certain device conditions, such as abstract device conditions. Others need to be configured based on physical devices, device types or similar device populations.

To configure or use devices and/or device types, a user interacts with device configuration area 403. Device configuration area 403 may be pre-populated with certain devices. For example color workflow system 1 may already be configured to directly control certain devices or may be in communication with a device controller configured for certain devices.

Element configuration area 430 allows a user to configure or display attributes of a selected color element. Element configuration area 430 depicts exemplary configuration information for the primary destination condition selected from map view area 420. Element configuration area 430 includes title area 431, identifying the type of element and configuration areas 432, 434, and 437. Configuration area 432, for example, identifies the device condition name associated with symbol 421. Control 433 enables a user to select a new device condition as a primary destination. Configuration area 434, for example, identifies the emulation target and method associated with symbol 422. Controls 435 and 436 enable a user to respectively select a new emulation target and method to be associated with the primary destination. Configuration area 437, for example, identifies historical changes in configuration and can, in some embodiments, allow a user to re-establish an historical configuration.

As an example of an operational scenario, a user can configure job information 6 in color workflow system 1 to select color settings 2 prior to receiving image data 100. Color settings 2 can include a color setup map 200 specifying various source conditions 3A-3C and destination conditions 5A-5C available to the job. Image processor 9 may then acquire image data 100A that is received from a source image capture device 101A having an associated source condition 3A specified in color setup map 200. Image processor 9 can automatically, or based on a user preference for the job, select a destination condition 5A-5C to reproduce image data 100.

Automatic selection of a primary destination condition 5A can be determined based on color setup map 200 (e.g. if only a primary destination was configured), or can be based on pre-defined rules (e.g. first make a proof of the type preferred by the customer) as examples. A user preference for selection can be specified at a system or job level as examples. At the system level, a user can specify preferred proof and final reproduction destination conditions 5A-5C. At a job level, a user can specify a particular destination condition (e.g. 5B) from amongst those specified in color setup map 200 associated with job information 6. In some embodiments, a user can also specify a color setup map 200 on a page or sub-page element basis within a job.

Regardless of the destination selection method, assume primary destination condition 5A has been selected. Image processor 9 can then automatically transform acquired image data 100 using the color management transform 107G associated with source condition 3A and selected primary destination condition 5A in color setup map 200. If an emulation condition 4 has been configured in color setup map 200 for destination condition 5A then an additional emulation transform 108 can be automatically applied after modified color management transform 107G in order to achieve a customized reproduction 15.

Selection of a destination condition 5A-5C may imply a specific destination device if a single device 101 is associated with the destination condition 5A-5C. Alternatively, many devices 101 may be associated with the destination condition 5A-5C and either color workflow system 1 or the user can select a specific device 101 as the destination device. In some situations, a destination device can be selected first which in turn can be used to narrow the selection of destination condition 5A-5C.

Thus, if properly configured, color workflow system 1 can automatically process acquired image data 100 to produce a reproduction 15 which matches color according to previously identified device responses and user preferences. Further, as device responses change and are recorded, color workflow system 1 automatically compensates for those changes by updating models and transforms so that reproduction 15 can be generated without changes to job information 6.

In some embodiments, a job may comprise a number of parts wherein each part may have different intent. As an example, a booklet or magazine may have a cover part, chapter parts, and insert parts. It may be appropriate for each part to be printed on a different primary destination and thus each part may be independently associated with a color setup map 200.

Embodiments of the present invention may comprise any medium which carries a set of computer-readable signals comprising instructions which, when executed by a computer processor, cause the computer processor to execute a method of the invention. Embodiments may be in any of a wide variety of forms. Embodiments may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The invention has been described in detail with particular reference to certain preferred embodiments thereof, but it will be understood that variations and modifications can be effected within the scope of the invention.

PARTS LIST

| | PARTS LIST |
|---|---|
| 1 | color workflow system |
| 2 | color settings |
| 3A-3C | source condition |
| 4 | emulation condition |
| 5A-5C | destination condition |
| 6 | job information |
| 7 | job processing instructions |
| 9 | image processor |
| 11 | image |
| 12 | image data editor |
| 13 | consumable |
| 14 | contone image reproduction |
| 15 | halftone image reproduction |
| 16 | imaged medium |
| 17 | medium processor |
| 18 | processed medium |
| 19 | printing press |
| 20 | measurement device |
| 31A-31K | device-independent color coordinate |
| 32A-32N | color curve |
| 40 | measured data point |
| 41 | measured data point |
| 42 | estimated data point |
| 43 | point |
| 44 | point |
| 51A-51K | predicted color coordinate |
| 60 | point |
| 61 | inverted correction transform |
| 62 | predicted color coordinate |
| 100 | image data |
| 100A-100F | image data |
| 100D' | image data |
| 101 | device |
| 101A | image capture device |
| 101B | contone imaging device |
| 101C | halftone imaging device |
| 101D | destination device |
| 102 | basic tonal response |
| 103 | basic color response |
| 105A-105D | tone correction transform |
| 106 | color correction transform |
| 107A-107L | color management transform |
| 108 | emulation transform |
| 111 | tonally corrected device |
| 112 | corrected tonal response |
| 113 | tonally corrected color response |
| 121 | color corrected device |
| 123 | color corrected color response |
| 131 | color managed device |
| 133 | color managed color response |
| 141 | device input |
| 142 | tonally corrected device input |
| 143 | color corrected device input |
| 144 | color managed device input |
| 200 | color setup map |
| 300 | method block |
| 302 | method block |
| 304 | method block |
| 306 | method block |
| 308 | method block |
| 310 | method block |
| 312 | method block |
| 314 | method block |
| 316 | method block |

-continued

| | PARTS LIST |
|---|---|
| 318 | method block |
| 320 | method block |
| 322 | method block |
| 324 | method block |
| 326 | method block |
| 328 | method block |
| 400 | user interface |
| 410 | color setup area |
| 401 | color setup map configuration area |
| 402 | device condition configuration area |
| 403 | device configuration area |
| 420 | map view area |
| 421 | symbol |
| 422 | symbol |
| 423 | symbol |
| 424 | symbol |
| 430 | element configuration area |
| 431 | title area |
| 432 | configuration area |
| 433 | control |
| 434 | configuration area |
| 435 | control |
| 436 | control |
| 437 | configuration area |

The invention claimed is:

1. A method for predicting a color response of a device, the method comprising:
operating the device with input image information wherein operating includes utilizing a first correction transform for modifying device color values;
determining a first device response based on a device output associated with a device input wherein the device response includes a color response;
obtaining a second correction transform; and
predicting a modified color response of the device, applicable to operating the device while utilizing the second correction transform instead of the first correction transform, wherein predicting is based on the first color response and the first and second correction transforms.

2. A method according to claim 1 wherein determining the first device response comprises creating a first color model for the device wherein the first color model is applicable to operating the device with the first correction transform and comprises at least one of a forward and a reverse model for estimating device-independent and device color values respectively from an input to the first color model.

3. A method according to claim 2 wherein predicting the modified color response of the device comprises adapting the first color model with at least one prediction transform.

4. A method according to claim 3 wherein creating the first color model also comprises creating a first color profile for the device wherein the first color profile is applicable to operating the device with the first correction transform.

5. A method according to claim 4 wherein one of the at least one prediction transform comprises a transform for generating a second corrected vector from a first corrected vector wherein both corrected vectors are based on a subject vector and wherein the first corrected vector comprises the subject vector modified by the first correction transform and wherein the second corrected vector comprises the subject vector modified by the second correction transform.

6. A method according to claim 4 comprising generating a second color profile for the device based on the first color profile and the at least one prediction transform wherein the second color profile is applicable for operating the device with the second correction transform.

7. A method according to claim 6 wherein generating the second color profile comprises associating an additional prediction transform, derived from the at least one prediction transform, with the first color profile.

8. A method according to claim 7 wherein associating the additional prediction transform comprises associating an inverse of one of the at least one prediction transform.

9. A method according to claim 6 wherein generating the second color profile comprises incorporating the at least one prediction transform into at least one "A curve" in an ICC profile.

10. A method according to claim 1 wherein the correction transform comprises one of a single-channel transform and a multi-channel transform.

11. A method according to claim 10 wherein the single-channel transform comprises a tone correction transform.

12. A method according to claim 10 wherein the multi-channel transform comprises a color correction transform intended to normalize the color response of the device.

13. A method according to claim 4 wherein adapting the first color model with the at least one prediction transform comprises generating a new color model corresponding to the device operating with the second correction transform.

14. A method according to claim 1 wherein the first correction transform comprises one of an identity transform and a nominal correction transform.

15. A method according to claim 1 wherein obtaining the second correction transform comprises modifying the first correction transform based on the first device response.

16. A method according to claim 1 wherein:
the device comprises an image reproduction device;
the input image information comprises image data including a plurality of input device color vectors;
utilizing the correction transform comprises modifying device color vectors based on the transform before providing them as input to the device; and
determining the first device response comprises measuring at least one device independent color value from an image area reproduced by the device and associating the measured color value with the input device color vector corresponding to the image area.

17. A method according to claim 1 wherein:
the device comprises an image capture device;
the input image information comprises an image including at least one image area associated with a known device-independent color value;
utilizing the correction transform comprises modifying device color vectors based on the transform after receiving them as output from the device; and
determining the first device response comprises associating a modified device color vector output for an image area with the known device-independent color value for the image area.

18. A method for predicting a color response of a device, the method comprising:
obtaining a first color response of the device, applicable to operating the device while utilizing a first correction transform for modifying device color values;
obtaining a second correction transform; and
predicting a modified color response of the device, applicable to operating the device while utilizing the second correction transform instead of the first correction transform, wherein predicting is based on the first color response and the first and second correction transforms.

19. A method according to claim 18 wherein obtaining the first color response of the device comprises obtaining one of a color model and a color profile.

20. An apparatus for predicting a color response of a device, the apparatus comprising a color workflow system, capable to:
communicate a plurality of device color values with the device wherein the device color values are either provided as inputs or received as outputs;
operate the device with input image information wherein operating includes utilizing a first correction transform for modifying device color values;
determine a first device response based on a device output associated with a device input wherein the device response includes a color response;
obtain a second correction transform; and
predict a modified color response of the device, applicable to operating the device while utilizing the second correction transform instead of the first correction transform, wherein the predicted color response is based on the first color response and the first and second correction transforms.

* * * * *